United States Patent
Chen et al.

(10) Patent No.: US 7,908,646 B1
(45) Date of Patent: *Mar. 15, 2011

(54) VIRTUALIZATION SYSTEM FOR COMPUTERS HAVING MULTIPLE PROTECTION MECHANISMS

(75) Inventors: Xiaoxin Chen, Fremont, CA (US); Alberto J. Munoz, Los Altos, CA (US); Jeffrey W. Sheldon, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 526 days.

This patent is subject to a terminal disclaimer.

(21) Appl. No.: 11/865,670

(22) Filed: Oct. 1, 2007

Related U.S. Application Data

(63) Continuation of application No. 10/378,126, filed on Mar. 3, 2003, now Pat. No. 7,278,030.

(51) Int. Cl.
*G06F 7/04* (2006.01)
(52) U.S. Cl. ............. 726/4; 713/189; 713/193; 711/200; 711/201; 711/163
(58) Field of Classification Search .................. None
See application file for complete search history.

(56) References Cited

U.S. PATENT DOCUMENTS

| | | | | |
|---|---|---|---|---|
| 6,397,242 B1 * | 5/2002 | Devine et al. | ..................... | 718/1 |
| 6,895,491 B2 * | 5/2005 | Kjos et al. | ..................... | 711/203 |
| 6,961,806 B1 * | 11/2005 | Agesen et al. | ..................... | 711/6 |
| 7,035,963 B2 * | 4/2006 | Neiger et al. | ..................... | 711/6 |

* cited by examiner

*Primary Examiner* — Nasser Moazzami
*Assistant Examiner* — Fikremariam Yalew
(74) *Attorney, Agent, or Firm* — Darryl A. Smith

(57) ABSTRACT

In a virtual computer system, the invention virtualizes a primary protection mechanism, which restricts memory accesses based on the type of access attempted and a current hardware privilege level, using a secondary protection mechanism, which is independent of the hardware privilege level. The invention may be used to virtualize the protection mechanisms of the Intel IA-64 architecture. In this embodiment, virtual access rights settings in a virtual TLB are translated into shadow access rights settings in a hardware TLB, while virtual protection key settings in a virtual PKR cache are translated into shadow protection key settings in a hardware PKR cache, based in part on the virtual access rights settings. The shadow protection key settings are dependent on the guest privilege level, but the shadow access rights settings are not.

20 Claims, 12 Drawing Sheets

| TLB.AR | TLB.PL | PRIVILEGE LEVEL | | | |
|---|---|---|---|---|---|
| | | 3 | 2 | 1 | 0 |
| 0 | 3 | R | R | R | R |
| | 2 | - | R | R | R |
| | 1 | - | - | R | R |
| | 0 | - | - | - | R |
| 1 | 3 | RX | RX | RX | RX |
| | 2 | - | RX | RX | RX |
| | 1 | - | - | RX | RX |
| | 0 | - | - | - | RX |
| 2 | 3 | RW | RW | RW | RW |
| | 2 | - | RW | RW | RW |
| | 1 | - | - | RW | RW |
| | 0 | - | - | - | RW |
| 3 | 3 | RWX | RWX | RWX | RWX |
| | 2 | - | RWX | RWX | RWX |
| | 1 | - | - | RWX | RWX |
| | 0 | - | - | - | RWX |
| 4 | 3 | R | RW | RW | RW |
| | 2 | - | R | RW | RW |
| | 1 | - | - | R | RW |
| | 0 | - | - | - | RW |
| 5 | 3 | RX | RX | RX | RWX |
| | 2 | - | RX | RX | RWX |
| | 1 | - | - | RX | RWX |
| | 0 | - | - | - | RWX |
| 6 | 3 | RWX | RW | RW | RW |
| | 2 | - | RWX | RW | RW |
| | 1 | - | - | RWX | RW |
| | 0 | - | - | - | RW |
| 7 | 3 | X | X | X | RX |
| | 2 | XP2 | X | X | RX |
| | 1 | XP1 | XP1 | X | RX |
| | 0 | XP0 | XP0 | XP0 | RX |

FIG. 6

| GUEST TLB.AR | GUEST TLB.PL | SHADOW TLB.AR | SHADOW TLB.PL | SHADOW KEY OFFSET |
|---|---|---|---|---|
| 0 | 3 | 0 | 3 | 0 |
|   | 2 |   |   | 1 |
|   | 1 |   |   | 2 |
|   | 0 |   |   | 3 |
| 1 | 3 | 1 | 3 | 0 |
|   | 2 |   |   | 1 |
|   | 1 |   |   | 2 |
|   | 0 |   |   | 3 |
| 2 | 3 | 2 | 3 | 0 |
|   | 2 |   |   | 1 |
|   | 1 |   |   | 2 |
|   | 0 |   |   | 3 |
| 3 | 3 | 3 | 3 | 0 |
|   | 2 |   |   | 1 |
|   | 1 |   |   | 2 |
|   | 0 |   |   | 3 |
| 4 | 3 | 2 | 3 | 4 |
|   | 2 |   |   | 5 |
|   | 1 |   |   | 6 |
|   | 0 |   |   | 3 |
| 5 | 3 | 3 | 3 | 7 |
|   | 2 |   |   | 8 |
|   | 1 |   |   | 9 |
|   | 0 |   |   | 3 |
| 6 | 3 | 3 | 3 | 10 |
|   | 2 |   |   | 11 |
|   | 1 |   |   | 12 |
|   | 0 | 2 |   | 3 |
| 7 | 3 | 1 | 3 | 13 |
|   | 2 |   |   | 14 |
|   | 1 |   |   | 15 |
|   | 0 |   |   | 3 |

FIG. 10

| SHADOW KEY OFFSET | GUEST PRIVILEGE LEVEL | | | |
|---|---|---|---|---|
| | 3 | 2 | 1 | 0 |
| 0 | RWX | RWX | RWX | RWX |
| 1 | - | RWX | RWX | RWX |
| 2 | - | - | RWX | RWX |
| 3 | - | - | - | RWX |
| 4 | R | RW | RW | RW |
| 5 | - | R | RW | RW |
| 6 | - | - | R | RW |
| 7 | RX | RX | RX | RWX |
| 8 | - | RX | RX | RWX |
| 9 | - | - | RX | RWX |
| 10 | RWX | RW | RW | RW |
| 11 | - | RWX | RW | RW |
| 12 | - | - | RWX | RW |
| 13 | X | X | X | RX |
| 14 | - | X | X | RX |
| 15 | - | - | X | RX |

VIRTUALIZATION SYSTEM FOR COMPUTERS HAVING MULTIPLE PROTECTION MECHANISMS

CROSS-REFERENCE TO RELATED APPLICATIONS

This application is a Continuation of U.S. patent application Ser. No. 10/378,126, filed 3 Mar. 2003, now issued as U.S. Pat. No. 7,278,030, which issued on 2 Oct. 2007.

BACKGROUND OF THE INVENTION

1. Field of the Invention

This invention relates to the field of computer virtualization, that is, to systems and methods for implementing computers as software running on an underlying host hardware platform.

2. Description of the Related Art

Virtualization has brought many advantages to the world of computers. As is well known in the art, a virtual machine (VM) is a software abstraction—a "virtualization"—of an actual physical computer system that runs as a "guest" on an underlying "host" hardware platform. As long as a suitable interface is provided between the VM and the host platform, one advantage is that the operating system (OS) in the guest need not be the same as the OS at the system level in the host. For example, applications that presuppose a Microsoft Windows OS can be run in the VM even though the OS used to handle actual I/O, memory management, etc., on the host might be Linux.

It usually requires less than 10% of the processing capacity of a CPU to run a typical application, although usage may peak briefly for certain operations. Virtualization can more efficiently use processing capacity by allowing more than one VM to run on a single host, effectively multiplying the number of "computers" per "box." Depending on the implementation, the reduction in performance is negligible, or at least not enough to justify separate, dedicated hardware "boxes" for each user.

Still another advantage is that different VMs can be isolated from and completely transparent to one another. Indeed, the user of a single VM will normally be unaware that he is not using a "real" computer, that is, a system with hardware dedicated exclusively to his use. The existence of the underlying host will also be transparent to the VM software itself. The products of VMware, Inc., of Palo Alto, Calif. provide all of these advantages in that they allow multiple, isolated VMs, which may (but need not) have OSs different from each other's, to run on a common hardware platform.

Example of a Virtualized System

FIG. 1 illustrates the main components of a system that supports a virtual machine as implemented in the Workstation product of VMware, Inc. As in conventional computer systems, both system hardware 100 and system software 200 are included. The system hardware 100 includes CPU(s) 102, which may be a single processor, or two or more cooperating processors in a known multiprocessor arrangement. The system hardware also includes system memory 104, one or more disks 106, and some form of memory management unit MMU 108. As is well understood in the field of computer engineering, the system hardware also includes, or is connected to, conventional registers, interrupt-handling circuitry, a clock, etc., which, for the sake of simplicity, are not shown in the figure.

The system software 200 either is or at least includes an operating system OS 220, which has drivers 240 as needed for controlling and communicating with various devices 110, and usually with the disk 106 as well. Conventional applications 260, if included, may be installed to run on the hardware 100 via the system software 200 and any drivers needed to enable communication with devices.

As mentioned above, the virtual machine (VM) 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer.

The VM's system software 312 includes a guest operating system 320, which may, but need not, simply be a copy of a conventional, commodity OS, as well as drivers 340 (DRVS) as needed, for example, to control the virtual device(s) 310. Of course, most computers are intended to run various applications, and a VM is usually no exception. Consequently, by way of example, FIG. 1 illustrates one or more applications 360 installed to run on the guest OS 320; any number of applications, including none at all, may be loaded for running on the guest OS, limited only by the requirements of the VM.

Note that although the hardware "layer" 301 will be a software abstraction of physical components, the VM's system software 312 may be the same as would be loaded into a hardware computer. The modifier "guest" is used here to indicate that the VM, although it acts as a "real" computer from the perspective of a user, is actually just computer code that is executed on the underlying "host" hardware and software platform 100, 200. Thus, for example, I/O to the virtual device 310 will actually be carried out by I/O to the hardware device 110, but in a manner transparent to the VM.

If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 1 illustrates a single VM 300 merely for the sake of simplicity; in many installations, there will be more than one VM installed to run on the common hardware platform; all will have essentially the same general structure, although the individual components need not be identical.

Some interface is usually required between the VM 300 and the underlying "host" hardware 100, which is responsible for actually executing VM-related instructions and transferring data to and from the actual, physical memory 104. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 54-45.

A VMM is usually a relatively thin layer of software that runs directly on top of a host, such as the system software 200, or directly on the hardware, and virtualizes the resources of the (or some) hardware platform. The VMM will typically include at least one device emulator 410, which may also form the implementation of the virtual device 310. The interface exported to the respective VM is usually such that the guest OS 320 cannot determine the presence of the VMM. The VMM also usually tracks and either forwards (to the host OS 220) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

In FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In some configurations, the VMM 400 runs as a software layer between the host system software 200 and the VM 300. In other configurations, such as the one illustrated in FIG. 1, the VMM runs directly on the hardware platform 100 at the same system level as the host OS. In such case, the VMM may use the host OS to perform certain functions, including I/O, by calling (usually through a host API—application program interface) the host drivers 240. In this situation, it is still possible to view the VMM as an additional software layer inserted between the hardware 100 and the guest OS 320. Furthermore, it may in some cases be beneficial to deploy VMMs on top of a thin software layer, a "kernel," constructed specifically for this purpose.

FIG. 2 illustrates yet another implementation, in which the kernel 700 takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 220 of the underlying physical computer, or whatever system-level software handles actual I/O operations, takes faults and interrupts, etc. for the VM. The invention may be used in all the different configurations described above.

Memory Mapping and Address Terminology

In most modern computers, memory is addressed as units known as "pages," each of which is identified by a corresponding page number. The most straightforward way for all components in a computer to uniquely identify a memory page would be for them all simply to use a common set of page numbers. This is almost never done, however, for many well-known reasons. Instead, user-level software normally refers to memory pages using one set of identifiers, which is then ultimately mapped to the set actually used by the underlying hardware memory.

When a subsystem requests access to the hardware memory 104, for example, the request is usually issued with a "virtual address," since the memory space that the subsystem addresses is a construct adopted to allow for much greater generality and flexibility. The request must, however, ultimately be mapped to an address that is issued to the actual hardware memory. This mapping, or translation, is typically specified by the operating system (OS), which includes some form of memory management module 245 included for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When writing a given word to a virtual address in memory, the processor breaks the virtual address into a page number (higher-order address bits) plus an offset into that page (lower-order address bits). The virtual page number (VPN) is then translated using mappings established by the OS into a physical page number (PPN) based on a page table entry (PTE) for that VPN in the page table associated with the currently active address space. The page table will therefore include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of a hardware memory management unit (MMU) 108. The TLB contains, among other information, VA-to-PA mapping entries at least for VPNs that have been addressed recently or frequently. Rather than searching the entire page table, the TLB is searched first instead. If the current VPN is not found in the TLB, then a "TLB miss" occurs, and the page tables in memory are consulted, by either the OS or the MMU 108, to find the proper translation, and the TLB is updated to include this translation. The OS thus specifies the mapping, but the hardware MMU 108 usually actually performs the conversion of one type of page number to the other. Below, for the sake of simplicity, when it is stated that a software module "maps" page numbers, the existence and operation of a hardware device such as the MMU 108 may be assumed.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Patterson and Hennessy analogize address translation to finding a book in a library. The VPN is the "title" of the book and the full card catalog is the page table. A catalog card is included for every book in the library and tells the searcher where the book can be found. The TLB is then the "scratch" paper on which the searcher writes down the locations of the specific books he has previously looked up.

An extra level of addressing indirection is typically implemented in virtualized systems in that a VPN issued by an application 360 in the VM 300 is remapped twice in order to determine which page of the hardware memory is intended. A mapping module 345 within the guest OS 320 translates the guest VPN (GVPN) into a corresponding guest PPN (GPPN) in the conventional manner. The guest OS therefore "believes" that it is directly addressing the actual hardware memory, but in fact it is not. Of course, a valid address to the actual hardware memory address must, however, ultimately be used.

An address mapping module 445 in the VMM 400 therefore takes the GPPN issued by the guest OS 320 and maps it to a hardware page number PPN that can be used to address the hardware memory. From the perspective of the guest OS, the GVPN and GPPN are virtual and physical page numbers just as they would be if the guest OS were the only OS in the system. From the perspective of the actual host OS, however, the GPPN is a page number in the virtual address space, that is, a VPN, which is then mapped into the physical memory space of the hardware memory as a PPN. Note that in some literature involving virtualized systems, GVPNs, GPPNs, VPNs and PPNs are sometimes referred to as "VPNs," "PPNs," "VPNs" and "PPNs," respectively, where "PPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN→PPN mapping performed by the VMM is transparent to the guest system, and the host OS need not maintain a GVPN→GPPN mapping.

Speed is a critical issue in virtualization—a VM that perfectly emulates the functions of a given computer but that is too slow to perform needed tasks is obviously of little good to a user. Ideally, a VM should operate at the native speed of the underlying host system. In practice, even where only a single VM is installed on the host, it is impossible to run a VM at native speed, if for no other reason than that the instructions that define the VMM must also be executed. Near native speed, is possible, however, in many common applications.

The highest speed for a VM is found in the special case where every VM instruction executes directly on the hardware processor. This would in general not be a good idea, however, because the VM should not be allowed to operate at the greatest privilege level; otherwise, it might alter the instructions or data of the host OS or the VMM itself and cause unpredictable behavior. Moreover, in cross-architectural systems, one or more instructions issued by the VM may not be included in the instruction set of the host processor. Instructions that cannot (or must not) execute directly on the host are typically converted into an instruction stream that can. This conversion process is commonly known as "binary translation."

U.S. Pat. No. 6,397,242 (Devine, et al., "Virtualization system including a virtual machine monitor for a computer with a segmented architecture"), which is incorporated herein by reference, describes a system in which the VMM includes a mechanism that allows VM instructions to execute directly on the hardware platform whenever possible, but that switches to binary translation when necessary. This allows for the speed of direct execution combined with the security of binary translation.

A virtualization system of course involves more than executing VM instructions—the VMM itself is also a software mechanism defined by instructions and data of its own. For example, the VMM might be a program written in C, compiled to execute on the system hardware platform. At the same time, an application 360 written in a language such as Visual Basic might be running in the VM, whose guest OS may be compiled from a different language.

There must also be some way for the VM to access hardware devices, albeit in a manner transparent to the VM itself. One solution would of course be to include in the VMM all the required drivers and functionality normally found in the host OS 220 to accomplish I/O tasks. Two disadvantages of this solution are increased VMM complexity and duplicated effort—if a new device is added, then its driver would need to be loaded into both the host OS and the VMM. In systems that include a host OS (as opposed to a dedicated kernel such as shown in FIG. 2), a much more efficient method has been implemented by VMware, Inc., in its Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). For I/O to at least some devices, however, the VMM may issue requests via the host OS 220. To make this possible, a special driver VMdry 242 is installed as any other driver within the host OS 220 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the driver VMdry 242, which then issues calls to the application VMapp 500, which then carries out the I/O request by calling the appropriate routine in the host OS.

In FIG. 1, the vertical line 600 symbolizes the boundary between the virtualized (VM/VMM) and non-virtualized (host software) "worlds" or "contexts." The driver VMdry 242 and application VMapp 500 thus enable communication between the worlds even though the virtualized world is essentially transparent to the host system software 200.

Privilege Levels

As described above, the guest software, including even the guest OS 320, should not be allowed to operate at the greatest privilege level of the system hardware to protect the host OS and the VMM. At the same time, however, the guest software should not be able to detect that it is not running on a "real" computer. On a "real" computer, the guest software would generally be able to operate at any privilege level of the system. Thus, the VMM should give the VM the impression that it can operate at any privilege level, without actually allowing guest instructions to execute at the greatest privilege level. In other words, the number of privilege levels at which the VM is allowed to operate should be less than the number of privilege levels at which the VM "believes" it can operate. Thus, the VMM must solve the well-known problem of "ring compression." If the privilege levels are viewed as concentric protection rings, with the most-privileged ring on the inside, the VM is given the impression that it is operating in all of the protection rings, while it is prevented from operating in the inner most ring.

Various techniques have been developed to address the issue of ring compression. See, for example, Judith S. Hall and Paul T. Robinson, "Virtualizing the VAX Architecture," Computer Architecture News, vol. 19, May 1991, pp. 380-389. Most of these techniques, however, limit access to one or more of the protection rings or require hardware modifications. These techniques, therefore, would generally not be preferred in the context of a VMM. What is needed, therefore, is a technique that limits the privilege levels at which the VM is allowed to operate, while giving the appearance that the VM is operating at all privilege levels. In particular, such a technique is needed for next generation processor architectures that provide multiple protection mechanisms, such as the 64-bit Intel IA-64 architecture, which provides access right restrictions in page table entries as a first protection mechanism, as well as domain protection keys as a second protection mechanism. This invention provides such a technique.

SUMMARY OF THE INVENTION

The invention virtualizes a first protection mechanism that is dependent on a guest privilege level at which a virtual machine is executing using a second hardware protection mechanism that is dependent on a hardware privilege level and a third hardware protection mechanism that is independent of the hardware privilege level. The virtual machine is allowed to operate at any guest privilege level while the hardware privilege level is restricted to less than all of the available privilege levels. A first set of protection settings is provided in the virtual machine for controlling the first protection mechanism. A second set of protection settings is selected for the second protection mechanism, the second set of protection settings being dependent on the first set of protection settings but independent of the guest privilege level, the second set of protection settings being selected to permit all memory accesses that should be permitted according to the first protection mechanism. Also, a third set of protection settings is selected for the third protection mechanism, the third set of protection settings being dependent on the first set of protection settings and the guest privilege level, the third set of protection settings being selected to prevent memory accesses that should be prevented according to the first protection mechanism, but which are permitted under the second protection mechanism.

In one embodiment of the invention, a fourth protection mechanism is also virtualized, the fourth protection mechanism being independent of the guest privilege level. In this embodiment, the third set of protection settings is selected to also prevent memory accesses that should be prevented according to the fourth protection mechanism. In one such embodiment, the first and second protection mechanisms are access rights protection mechanisms and the third and fourth protection mechanisms are domain protection key mechanisms. In one such embodiment, the virtual machine is based on the Intel IA-64 architecture, and the virtual machine executes on a physical hardware system that is also based on the Intel IA-64 architecture.

In another embodiment, the second set of protection settings is selected by translating the first set of protection settings according to a predetermined method. In yet another embodiment, the third set of protection settings is selected by translating the first set of protection settings according to a predetermined method, using the guest privilege level.

In yet another embodiment, in which a fourth protection mechanism is also virtualized, the fourth protection mechanism being independent of the guest privilege level, and the third set of protection settings is selected to also prevent memory accesses that should be prevented according to the fourth protection mechanism, a fourth set of protection settings is provided in the virtual machine for controlling the fourth protection mechanism, and the third set of protection settings is selected by translating the first and fourth sets of protection settings according to a predetermined method, using the guest privilege level.

In another embodiment, the first and second protection mechanisms are access rights protection mechanisms and the third protection mechanism is a protection key mechanism, and the first set of protection settings is used to determine a set of shadow key offset values that are used to select the third set of protection settings. In one such embodiment, the shadow key offset values are added to shadow key base values to form shadow keys for use in the third protection mechanism. In one such embodiment, the shadow key base values are determined in an arbitrary manner. In yet another such embodiment, a shadow key offset value corresponds with multiple different settings in the first set of protection settings.

In yet another embodiment, a plurality of copies of the third set of protection settings are stored, one copy for each guest privilege level, the stored copies corresponding to the third set of protection settings used the last time the virtual machine was operating at the respective guest privilege level. In one such embodiment, the copy corresponding to the current guest privilege level is updated each time the third set of protection settings is updated.

BRIEF DESCRIPTION OF THE DRAWINGS

FIG. 6 shows the access types that are permitted for each privilege level in the Intel IA-64 architecture for all possible combinations of access right and privilege level settings in a page table entry.

FIG. 10 shows shadow access rights settings and shadow key offset values corresponding to all possible guest access rights settings in one embodiment of the invention.

FIG. 11 shows shadow enable bits corresponding to every possible combination of guest privilege level and shadow key offset value in one embodiment of the invention.

DETAILED DESCRIPTION

Figure 1:
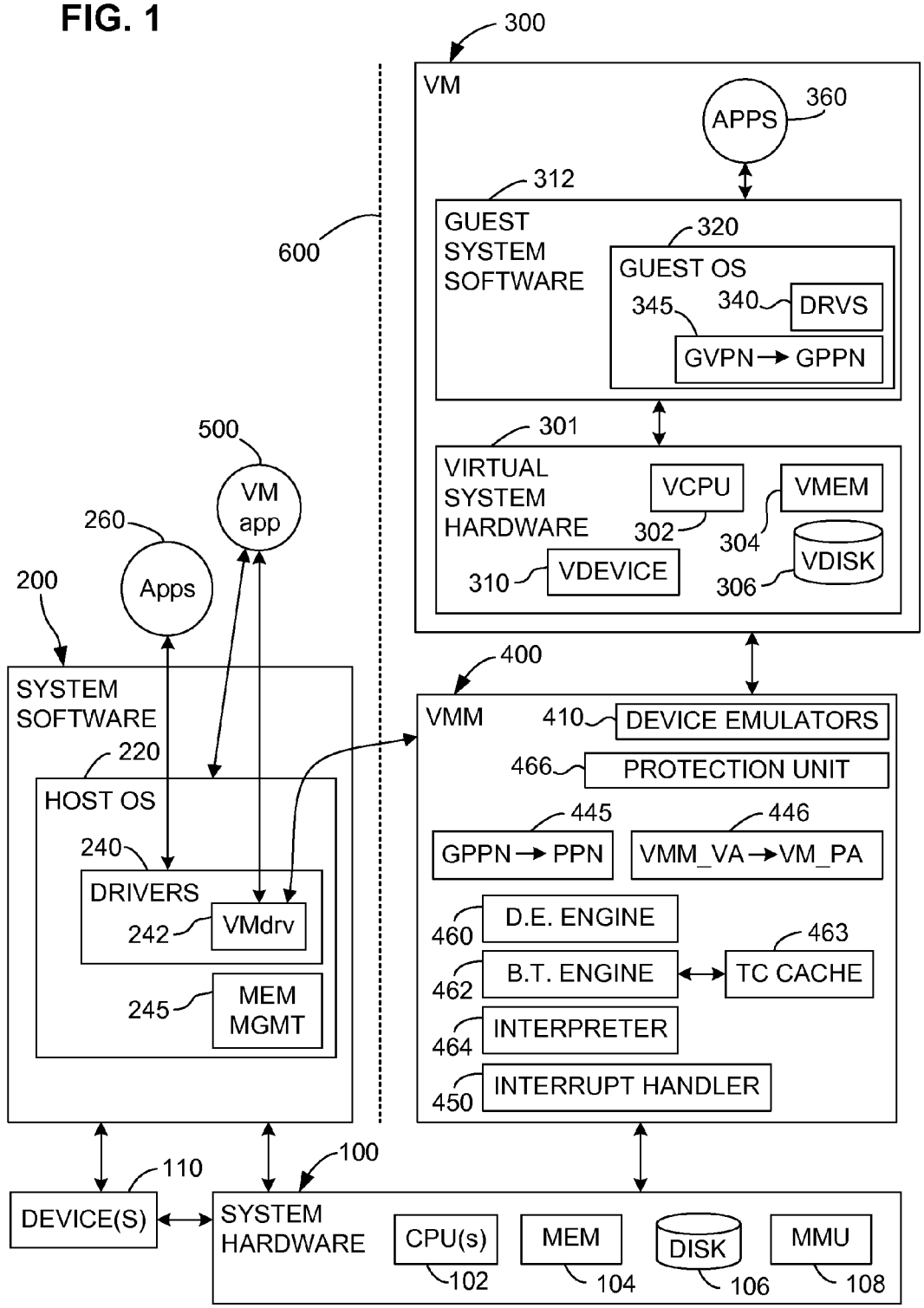
FIG. 1 illustrates a virtual computer system installed on a host platform, with a virtual machine monitor (VMM) at the same system level as the host operating system.

This invention enables the privilege level at which guest software executes in a virtual computer system to be restricted, while implementing memory access rights as if the guest privilege level were not restricted. The invention uses a primary protection mechanism, which is dependent on the hardware privilege level, in combination with a secondary protection mechanism, which is not dependent on the hardware privilege level, such as a protection key mechanism. The preferred embodiment is described in terms of a VMM that executes on the 64-bit Intel IA-64 architecture and that virtualizes the Intel IA-64 architecture. The invention may also be implemented in VMMs that execute on other hardware platforms and that virtualize other hardware platforms, including VMMs in which the virtualized hardware platform is substantially different from the physical hardware platform. In addition, the invention may be implemented in contexts other than VMMs. The invention may be implemented in any context in which the privilege level at which software is executed is to be restricted, while access rights are to be limited as if there were no restriction on privilege levels, and in which the hardware platform uses protection keys or any similar secondary protection mechanism.

In one embodiment of the invention, as described above, the VMM 400 allows some guest instructions, including instructions from the guest system software 312 and the guest applications 360, to be executed directly on the system hardware 100. Whenever guest instructions are being directly executed, the system hardware is kept at its least-privileged level, with a privilege level (CPL) of 3. At the same time, however, the guest software is given the impression that it can execute at any of the four privilege levels of the IA-64 architecture. The VMM achieves this result, in part, by maintaining a guest privilege level within the VM that may differ from the privilege level of the system hardware. The guest software may change the guest privilege level to any of the four levels without directly affecting the privilege level of the system hardware.

Before allowing guest instructions to be directly executed, the VMM 400 sets the privilege level of the system hardware to the least-privileged level, regardless of the current guest privilege level. The VMM also configures the system hardware 100 so that any attempt to change the privilege level will result in an interrupt, which will be handled by the VMM. When such an interrupt occurs, the VMM changes the hardware privilege level to the most-privileged level and then emulates the execution of the guest instruction in software (i.e. through software interpretation). The VMM adjusts the guest privilege level in the same manner that the hardware privilege level would have been adjusted if the guest instruction had been executed on real hardware. The VMM also takes other actions, as described below, to configure the system hardware 100 to respond in a manner that is consistent with the new guest privilege level.

After interpreting the guest instruction, the VMM 400 may emulate one or more additional guest instructions using either an interpreter or a binary translator. In binary translation, guest instructions are translated into a set of target instructions that are safe for execution on the system hardware 100, and that generate the same results as the guest instructions would have generated had they been executed on the virtualized system. The target instructions are loaded into a translation cache and the system hardware begins executing the target instructions from the translation cache. The interpretation of guest instructions and the execution of translated instructions are considered safe because they are both under the control of the VMM 400. Thus, both of these methods of emulating guest instructions are performed at the most-privileged level of the system hardware 100, with a CPL of 0.

At some point, the VMM 400 will again configure the system hardware 100 for direct execution of guest instructions, including setting the hardware privilege level to a value of 3, regardless of the guest privilege level. In this embodiment, the hardware privilege level will always be maintained at the least-privileged level during direct execution and at the most-privileged level during either interpretation or binary translation, while the guest privilege level may vary between any of the four possible values during direct execution, interpretation or binary translation.

One embodiment of this invention provides a protection mechanism for such a virtual computer system, in which some guest instructions are directly executed on the system hardware 100 at the least-privileged level, and other instructions are executed in software, through interpretation and/or translation, at the most-privileged level, while allowing the VM 300 to operate at any of the four privilege levels of the IA-64 architecture. The invention may also be implemented in other systems involving other combinations of privilege levels. For example, the invention may be implemented in a hardware platform that provides only two privilege levels, in which direct execution of guest instructions may be performed at the less-privileged level and execution of instructions in software may be performed at the more-privileged level. The invention may also be implemented in a system in which guest instructions may be directly executed at multiple privilege levels, such as privilege levels 3, 2 and 1 in the IA-64 architecture, but not at the most-privileged level. The invention may also be implemented in virtual computer systems that do not allow guest instructions to execute directly on the hardware, or other virtual computer systems that do not perform binary translation, or still other systems that do not interpret guest instructions.

IA-64 Memory Architecture

As additional background to the preferred embodiment of the invention, a brief description is provided of the main addressing conventions of the Intel IA-64 architecture. One distinction between this architecture and the 32-bit, IA-32 architecture is that the IA-64 memory space is non-segmented, but is divided into regions. Note that the term "segment" is also used in descriptions of the Intel IA-64, but not in the same sense as in segmented architectures. In a segmented memory architecture such as the IA-32, memory access is controlled using segment registers and various tables of segment "descriptors" that may be loaded into the registers. The main tables are the Local Descriptor Table (LDT) and the Global Descriptor Table (GDT). A VM running on this architecture will maintain similar tables for its virtual processor; thus, the VM will have a virtual LDT and a virtual GDT. The VMM may maintain shadow copies of these virtual descriptor tables to help ensure coherency and to increase security. Segmentation in the IA-32 (or earlier) context is thus related to hardware segment registers.

The Intel "IA-64 Software Conventions and Runtime Architecture Guide," September 2000, defines the difference between segments and regions in the IA-64 context:

Segment: An area of memory that has specific attributes and behaves as a fixed unit at runtime. All items within a segment have a fixed address relationship to one another at execution time, and have a common set of attributes. Items in different segments do not necessarily bear this relationship, and an application may not depend on one . . . . The use of this term is not related to the concept of a segment in the IA-32 architecture, nor is it directly related to the concept of a segment in an object file.

Region: The IA-64 architecture divides the address space into four or eight regions. In general, the runtime architecture is independent of which segments are assigned to which regions.

By definition, if addresses are 64 bits wide, then there are $2^{64}$ possible addresses, which comprise the entire theoretical virtual address space of the memory. No hardware memory could ever hold $2^{64}$ bytes (words, etc.), however, so the host OS and/or hardware memory management mechanisms map whatever subset of the $2^{64}$ possible memory addresses that is allocated for use by applications to physical memory.

Figure 3:
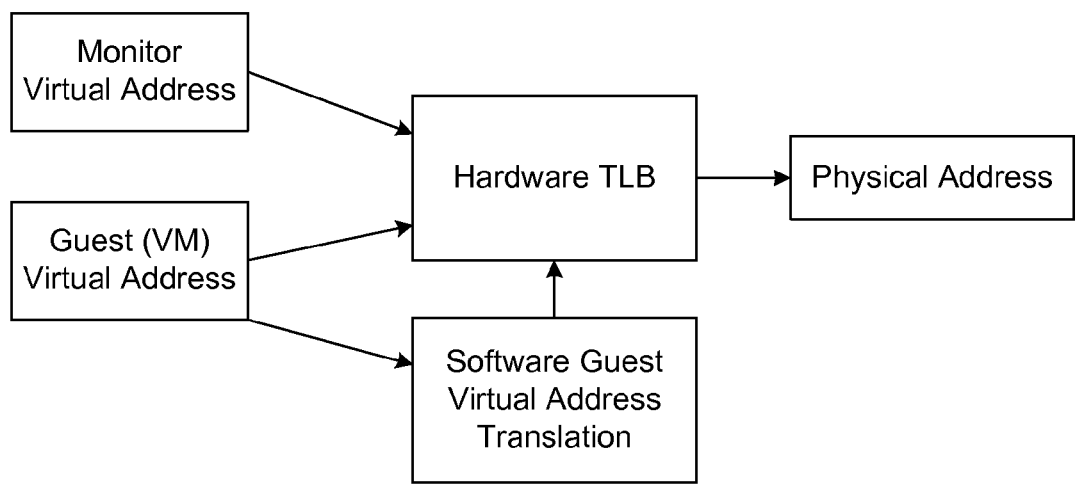
FIG. 3 illustrates memory access by a virtual machine (VM) and VMM.

FIG. 3 illustrates how the VMM and VM access memory from the perspective of the host OS. Note that the host OS will view the VMM and VM as applications and thus considers their addresses both to be "virtual," which are converted into "physical" addresses, following conventional terminology. As is mentioned above, virtualization introduces an additional level of addressing indirection, such that the "physical" addresses (GPAs) issued by the VM guest must be converted into hardware addresses (PAs). In virtualized systems in which the VMM is at the same system level as the host OS, the VMM itself can perform virtual-to-physical address translation or address directly the hardware structures such as the TLB used to translate addresses.

As FIG. 3 shows, when an instruction in the monitor virtual address space accesses guest memory, the hardware must get the physical (hardware) address for the instruction and the physical (hardware) address of the guest memory. This is accomplished by translating the monitor and guest virtual addresses into their corresponding physical addresses. This means that the VMM's virtual addresses coexist with the guest's (VM's) virtual addresses in the same virtual address space.

Figure 4:
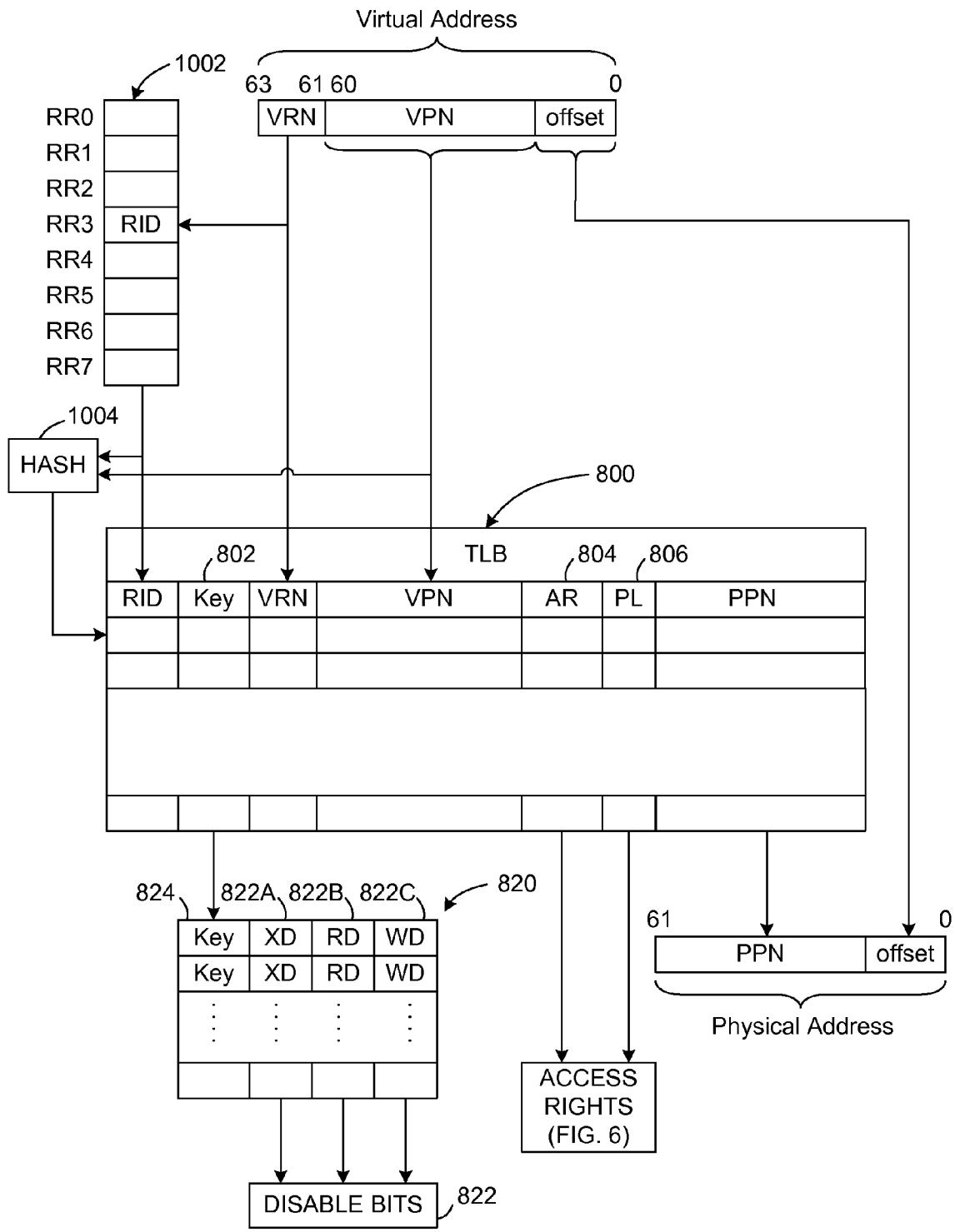
FIG. 4 illustrates various structures used to translate virtual addresses into physical addresses and to determine access rights under two protection mechanisms in the Intel IA-64 architecture.

FIG. 4, which is adapted from Intel Corp.'s "IA-64 Architecture Software Developer's Manual, Vol. 2, "Addressing and Protection," Rev. 1.0, January 2000, illustrates how virtual addresses are translated into physical addresses in a standard IA-64 system. FIG. 4 also illustrates protection settings that are used to determine whether an attempted memory access is permissible under both the access rights protection mechanism and the domain protection key mechanism of the IA-64 architecture. Each virtual address includes a virtual region number (VRN), indicated using the three MSBs of the address, a virtual page number (VPN) and an offset. The VRN is used both to search a corresponding field in the entries of a translation lookaside buffer (TLB) 800 and also to point into a set (RR0, RR1, . . . , RR7) of region registers 1002, each of which contains a 24-bit region identifier (RID).

To translate a virtual address into a physical address, the TLB 800 matches both the RID obtained from the RR of the VRN and the VPN with entries in the TLB. If a matching entry is found, the entry's physical page number (PPN) is concatenated with the page offset of the virtual address to form the physical address. Besides fields used for virtual address translation, the TLB entry also contains access rights bits and a protection key, which is matched against all protection key registers 820. The memory address translation succeeds only if both the access rights from the TLB entry allow the access and a matching protection key is found with the required permission, which is determined by a set of three access disable bits. Access rights and protection keys will be described in greater detail below.

If an address lookup fails in the TLB, then a conventional virtual hash page table VHPT walker, if enabled, searches for the translation in a virtual hash page table 1004 (VHPT). If a matching entry is found, then the translation is inserted into the TLB and the physical address is obtained. A page table address (PTA) register (not shown, for simplicity, but well known) controls the behavior of the VHPT walker: The PTA includes parameters that contain information (PTA.base) for creating the VHPT base address, for determining whether the VHPT walker is enabled (PTA.ve), and for determining whether the VHPT is in short format or long format (PTA.vf). There is also a bit in each entry of the region registers 1002 that indicates whether the VHPT walker is enabled for the particular region. More detailed information about the PTA's structure and function is available from publicly available manuals from Intel Corp. If a matching entry is not found in either the TLB or the VHPT, a TLB Miss fault issues and the OS responds by placing the required translation in the TLB. In any case, the required translation ends up in the TLB. Therefore, when the discussion below refers to a matching entry being found in the TLB, an assumption can generally be made that the matching entry could have been initially found in a VHPT or could have been provided by the OS in response to a TLB Miss fault.

IA-64 Protection Mechanisms

The Intel IA-64 architecture provides two distinct protection mechanisms. As described in the "Intel Itanium Architecture Software Developer's Manual," Volume 2, October 2002, the first mechanism involves the access rights bits associated with each translation. These bits provide privilege level-granular access to a page. The second mechanism involves the protection keys. Protection keys permit domain-granular access to a page. These are especially useful for mapping shared code and data segments in a globally shared region, and for implementing domains in a single address space operating system.

The access rights mechanism involves three access rights bits and two privilege level bits in a TLB entry that specify which types of memory access are permissible for an addressed memory page, based on the current privilege level, which is indicated in the Processor Status Register (or in the Register Stack Configuration register for some instructions). The protection key mechanism involves an eighteen to twenty-four-bit protection key in the TLB entry, which is compared with entries in a protection key register cache to determine which types of memory access are permitted using the protection key.

Figure 5:
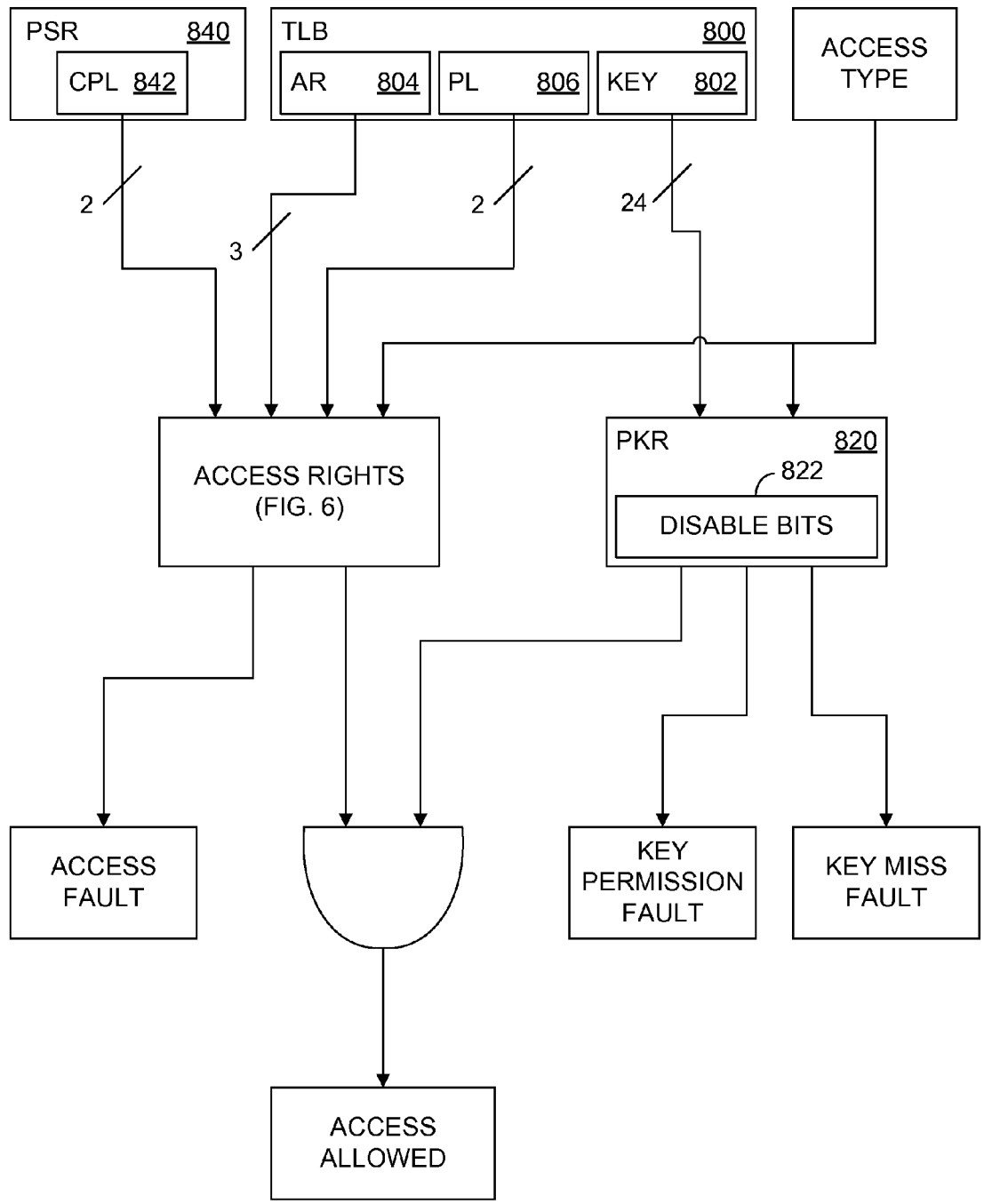
FIG. 5 illustrates the operation of two protection mechanisms in the Intel IA-64 architecture.

When a memory access is attempted and a translation is required from a virtual address to a physical address, the TLB 800 is searched for a matching entry, as described above. As shown in FIG. 5, the TLB entry contains three bits specifying access rights (TLB.ar 804), two bits specifying a privilege level (TLB.pl 806) and eighteen to twenty-four bits specifying a protection key (TLB.key 802). The IA-64 architecture includes a Processor Status Register (PSR) 840, which includes two bits specifying a Current Privilege Level (CPL 842). The TLB.ar 804, the TLB.pl 806, the CPL 842 and the type of memory access attempted (i.e. to read data, write data or execute an instruction) are used according to the table of FIG. 6 to determine whether the attempted memory access is permissible under the first, or primary, protection mechanism.

For every combination of TLB.ar 804, TLB.pl 806 and CPL 842, the letters R, W and X are used to indicate that the contents of the addressed memory page may be read, written or executed, respectively. For example, if a TLB entry that matches the virtual address for the attempted memory access has a TLB.ar 804 of 2 and a TLB.pl 806 of 1 and the CPL 842 is 1, a memory read or a memory write is permitted, but the contents of the memory page may not be retrieved for execution. If the CPL 842 then changes to a value of 2, however, no type of memory access would be permissible for the same page. FIG. 6 also shows several entries of P0, P1 or P2. As described in the Intel literature referenced above, an entry "Pn" means promote CPL 842 to privilege level "n" when an Enter Privileged Code (epc) instruction is executed. As shown in FIG. 5, application of the primary protection mechanism may result in an access fault if the combination of the TLB.ar 804, the TLB.pl 806 and the CPL 842 does not permit the attempted memory access according to the table of FIG. 6. On the other hand, if the combination of the TLB.ar 804, the TLB.pl 806 and the CPL 842 does permit the attempted memory access according to the table of FIG. 6, then the secondary protection mechanism must be applied to determine if the memory access is allowed. Both the access rights mechanism and the protection key mechanism must permit the access for the attempted memory access to succeed.

The secondary protection mechanism of the IA-64 architecture involves the TLB.key 802. As mentioned above, the protection key register cache (PKR) 820 is searched for the TLB.key 802 from the matching TLB entry. If the PKR 820 does not have an entry containing the TLB.key 802, a Key Miss fault results. Each entry in the PKR 820 contains a set of three disable bits, DR, DW and DX, which indicate whether the contents of the memory page may be read, written or executed, respectively. If the PKR 820 does have a matching entry, the disable bits for the matching entry are checked to determine whether the type of the attempted access is disabled. For example, if the attempted memory access is a write and the DW bit is set, the attempted memory access is not permitted and a Key Permission fault results. If the access rights mechanism allows the attempted memory access, instead of issuing an access fault, and the protection key mechanism allows the attempted memory access, instead of issuing either a Key Miss fault or a Key Permission fault, then the attempted memory access is permitted.

Figure 7:
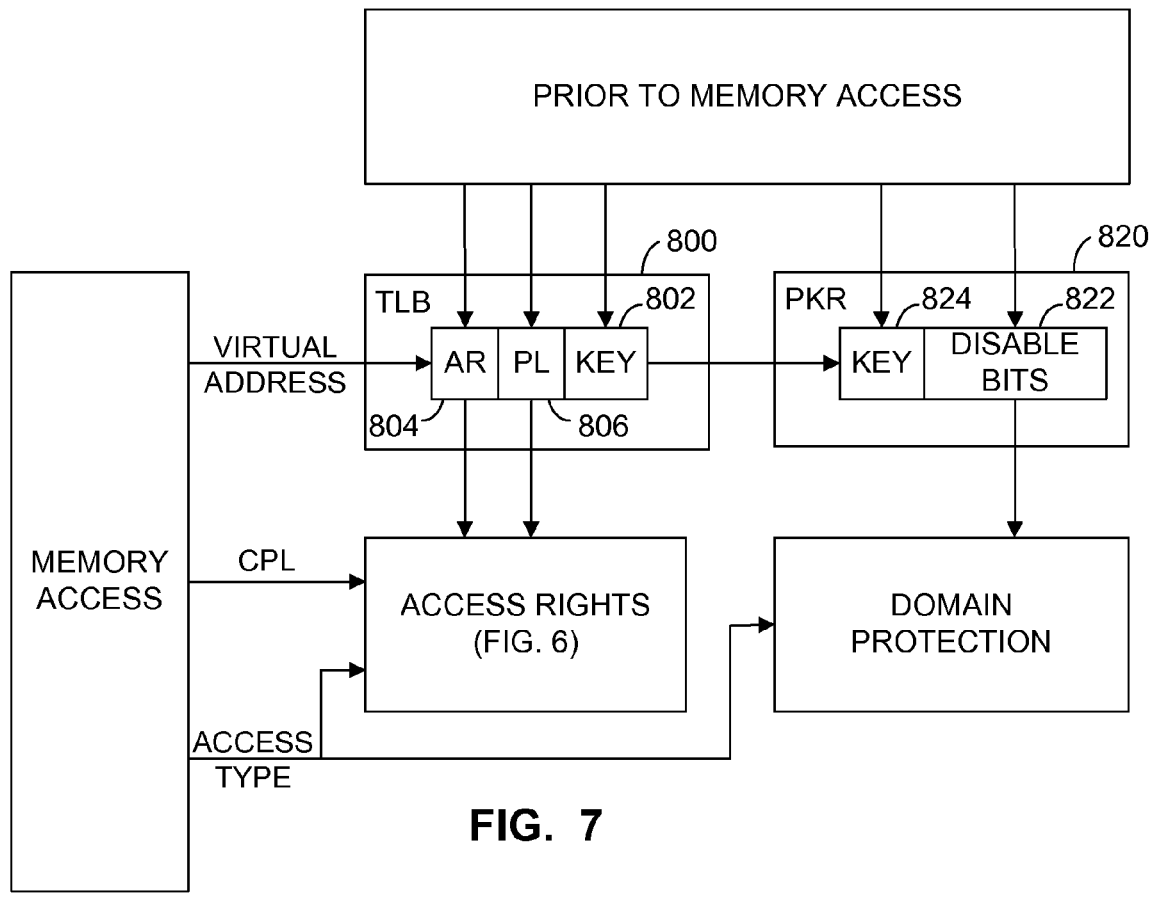
FIG. 7 illustrates the steps required to setup the protection mechanisms in the Intel IA-64 architecture, as well as the operation of the protection mechanisms.

Now the steps illustrated in FIG. 5 to determine whether an attempted memory access is permissible are taken at the time of the attempted memory access. However, the protection settings in the TLB entry, specifically the TLB.ar 804, the TLB.pl 806 and the TLB.key 802, must be established prior to the attempted memory access. Also, the matching protection key and the corresponding disable bits must be loaded into the PKR 820 prior to the attempted memory access. FIG. 7 illustrates the loading of the values TLB.ar 804, TLB.pl 806 and TLB.key 802 prior to the attempted memory access, as well as the key 824 and the disable bits 822 of the entry in the PKR 820. FIG. 7 also illustrates that, during an attempted memory access, a virtual address is used to determine an appropriate entry within the TLB 800. The TLB.ar 804, the TLB.pl 806 and the TLB.key 802 are taken from the TLB entry. The TLB.ar 804, the TLB.pl 806, the CPL 842 and the type of the memory access are used to determine whether the attempted memory access is permitted under the access rights protection mechanism. The TLB.key 802 is used to determine an appropriate entry within the PKR 820. The disable bits 822 are taken from the PKR entry. The disable bits 822 and the type of the memory access are used to determine whether the attempted memory access is permitted under the protection key mechanism, or the "domain" protection mechanism.

Virtualization of IA-64 Protection Mechanisms

Figure 8:
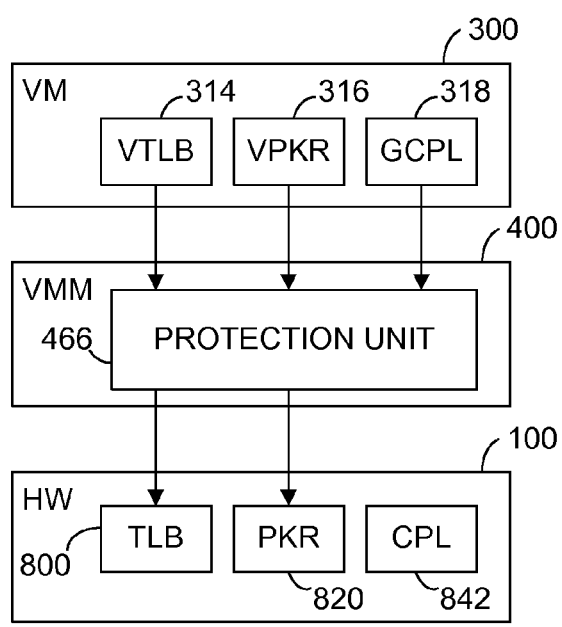
FIG. 8 illustrates a virtual computer system installed on a host platform, emphasizing the virtualization of protection mechanisms.

FIG. 8 illustrates a generalized virtual computer system in which the invention may be implemented. The virtual computer system includes the system hardware 100, including the TLB 800, the PKR 820 and the CPL 842. The CPL 842 is part of a Processor Status Register (not shown for simplicity, but fully described in published literature from Intel). Only one TLB 800, one PKR 820 and one CPL 842 are illustrated in FIG. 8, which could be interpreted to suggest only a single CPU in the system hardware 100. However, the invention may be implemented in single processor systems or multiprocessor systems.

Figure 2:
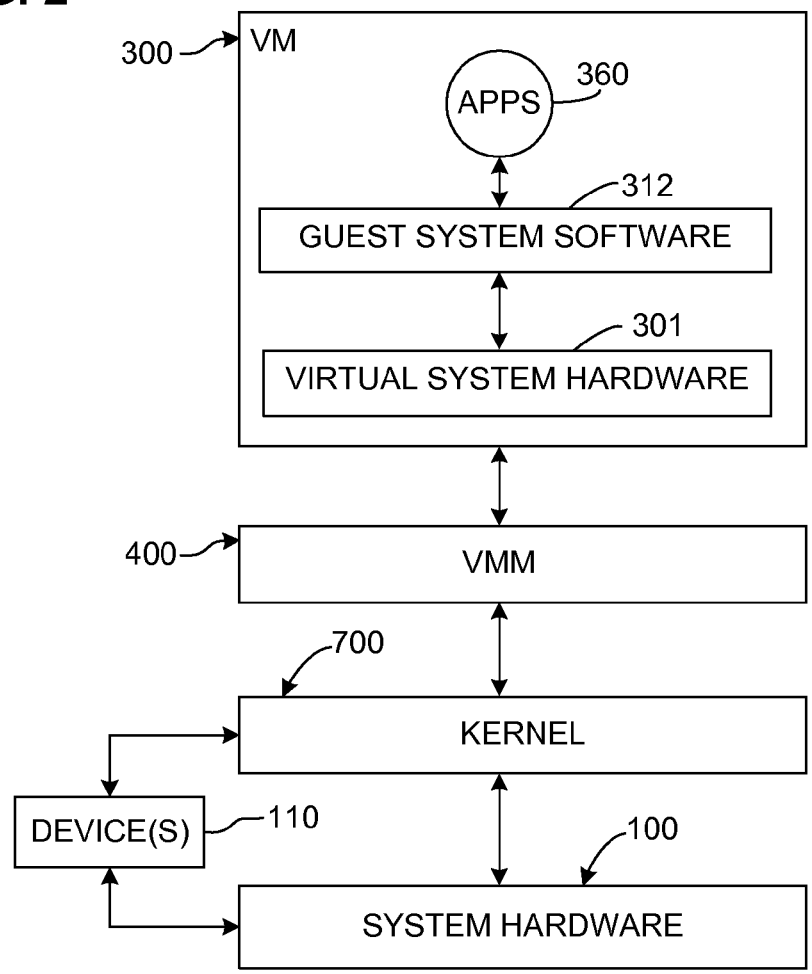
FIG. 2 illustrates an alternative configuration of a virtual computer system, which includes a kernel on which the VMM runs.

The VMM 400 runs on the system hardware 100 and includes the protection unit 466. The VMM 400 may run on top of a kernel 700, as illustrated in FIG. 2, or along with a host OS 220, as illustrated in FIG. 1, for example. The VMM 400 virtualizes a hardware platform to create and maintain the VM 300, including a virtual TLB (VTLB) 314, a virtual PKR (VPKR) 316 and a guest current privilege level (GCPL) 318. The entries within the VTLB 314 are functionally equivalent to the entries within the hardware TLB 800, including access rights bits 314A, privilege level bits 314B and a protection key 314C, although these components of a VTLB entry are not illustrated in FIG. 8. Also, the entries within the VPKR 316 are functionally equivalent to the entries within the hardware PKR 820, including a protection key 316A and a set of three disable bits 316B, although these components of a VPKR entry are not illustrated in FIG. 8 either. The GCPL 318 is part of a virtual Processor Status Register (not shown for simplicity, but functionally equivalent to the Processor Status Register in the hardware microprocessor). In the preferred embodiment, the system hardware 100 and the VM 300 are each based on the IA-64 architecture.

Now the guest software executing on the VM 300 interacts with the VTLB 314, the VPKR 316 and the GCPL 318 just as if these structures were implemented in real hardware. Thus, the guest software sets access rights bits, privilege level bits and keys within the VTLB 314, as well as keys and disable bits within the VPKR 316, to control access to different pages in guest memory, under both the access rights protection mechanism and the domain protection key mechanism. Also, the GCPL 318 tracks the current privilege level at which the guest software is executing. However, the hardware 100 uses the TLB 800, the PKR 820 and the CPL 842 to determine permissible memory accesses under the two protection mechanisms. The VMM 400, and the protection unit 466 in particular, set up the protection settings within the TLB 800 and the PKR 820 so that the hardware 100 will permit memory accesses in accordance with the protection settings in the VTLB 314 and the VPKR 316. However, the CPL 842 does not track the current privilege level of the guest software. Instead, as described above, while the GCPL 318 tracks the guest privilege level through any of the four privilege levels, the CPL 842 is set and maintained at the least-privileged level, a CPL value of 3, for direct execution of guest instructions, and the CPL 842 is set and maintained at the most-privileged level, a CPL value of 0, for the interpretation or binary translation of guest instructions.

As a result, the protection settings in the VTLB 314 and the VPKR 316 cannot simply be copied into the TLB 800 and the PKR 820. Actually, the keys from the entries in the VTLB 314 and the keys and the disable bits from the VPKR 316 could be copied directly into the hardware TLB 800 and the hardware PKR 820, and the domain protection key mechanism would be correctly virtualized, because the protection key mechanism does not depend on the privilege level at which software is executing. However, directly copying the access rights bits and the privilege level bits from the entries in the VTLB 314 into the hardware TLB 800 would not accurately virtualize the access rights protection mechanism.

For example, suppose the guest software sets the access rights bits in a VTLB entry to a value of 2 and the privilege level bits in the VTLB entry to a value of 1. Suppose further that the VMM 400 is in direct execution mode and that the guest software is currently executing at a privilege level of 1 when a memory read is attempted from the virtual page that matches the VTLB entry. As shown in the table of FIG. 6, this attempted memory access should be permitted under the access rights mechanism. However, the hardware privilege level is 3, because the VMM 400 is in direct execution mode. If the same access rights settings were loaded into a matching entry in the TLB 800, the attempted memory access would not be permitted by the hardware because a TLB.ar 804 of 2, a TLB.pl 806 of 1 and a privilege level 842 of 3 does not allow for any memory accesses under the access rights mechanism, as shown in the table of FIG. 6.

So, given that the hardware CPL 842 does not track the guest privilege level, a mechanism is needed to accurately virtualize the access rights protection mechanism of the IA-64 architecture. One possible solution to this problem would be to translate the access rights settings in the VTLB 314 into different access rights settings for the TLB 800, based on the current guest privilege level, to achieve the desired results. In the example described above, knowing that the guest privilege level is 1, but the hardware privilege level is 3, the entry in the VTLB 314 having an access rights value of 2 and a privilege level value of 1 can be translated into an entry in the TLB 800 having an access rights value of 2 and a privilege level value of 3. Such a translation would yield an accurate virtualization for this particular situation. The attempted memory accesses that would be permitted based on the hardware access rights settings and the hardware privilege level would match the memory accesses that should be permitted based on the virtual access rights settings and the guest privilege level, so long as the guest privilege level and the hardware privilege level do not change. A similar translation from virtual access rights settings in the VTLB 314 to corresponding access rights settings in the TLB 800 could be provided for any combination of access rights settings in the VTLB 314, based on the current guest privilege level.

Suppose, however, that the translated access rights settings of TLB.ar=2 and TLB.pl=3 are inserted into the TLB entry, but then the guest privilege level changes to 2. Now the same attempted access should not be permitted according to the access rights settings in the VTLB 314, but the access would be permitted, based on the access rights settings in the hardware TLB 800. With the change in the guest privilege level, the access rights settings in the TLB 800 would need to be modified to continue to provide an accurate virtualization of the access rights protection mechanism. In the example above, the privilege level bits in the entry in the TLB 800 could be changed to a value of 2 to provide the correct outcome for the new guest privilege level of 2. The access rights settings for each TLB entry could be changed in this manner to account for the new guest privilege level. The access rights protection mechanism could be virtualized using this technique, with the access rights settings in the hardware TLB entries being modified each time there is a change in the guest privilege level.

A more practical implementation of the above technique would involve flushing the TLB 800 each time the guest privilege level is changed. Subsequent attempted memory accesses would result in TLB Miss faults. The new TLB entries that are inserted in response to the TLB Miss faults would take the new guest privilege level into account when translating from the virtual access rights in the VTLB 314 to the hardware access rights in the TLB 800. However, this solution would be very expensive in terms of slowing down system performance. Flushing the TLB 800 and responding to all of the subsequent TLB Miss faults would generally be prohibitively expensive in terms of processing resources.

This invention implements a different, more efficient solution to the ring compression problem. The invention uses the PKR 820 of the protection key mechanism, along with the access rights bits, to virtualize the access rights protection mechanism, without having to flush the TLB 800 each time the privilege level of the guest software changes.

Figure 9:
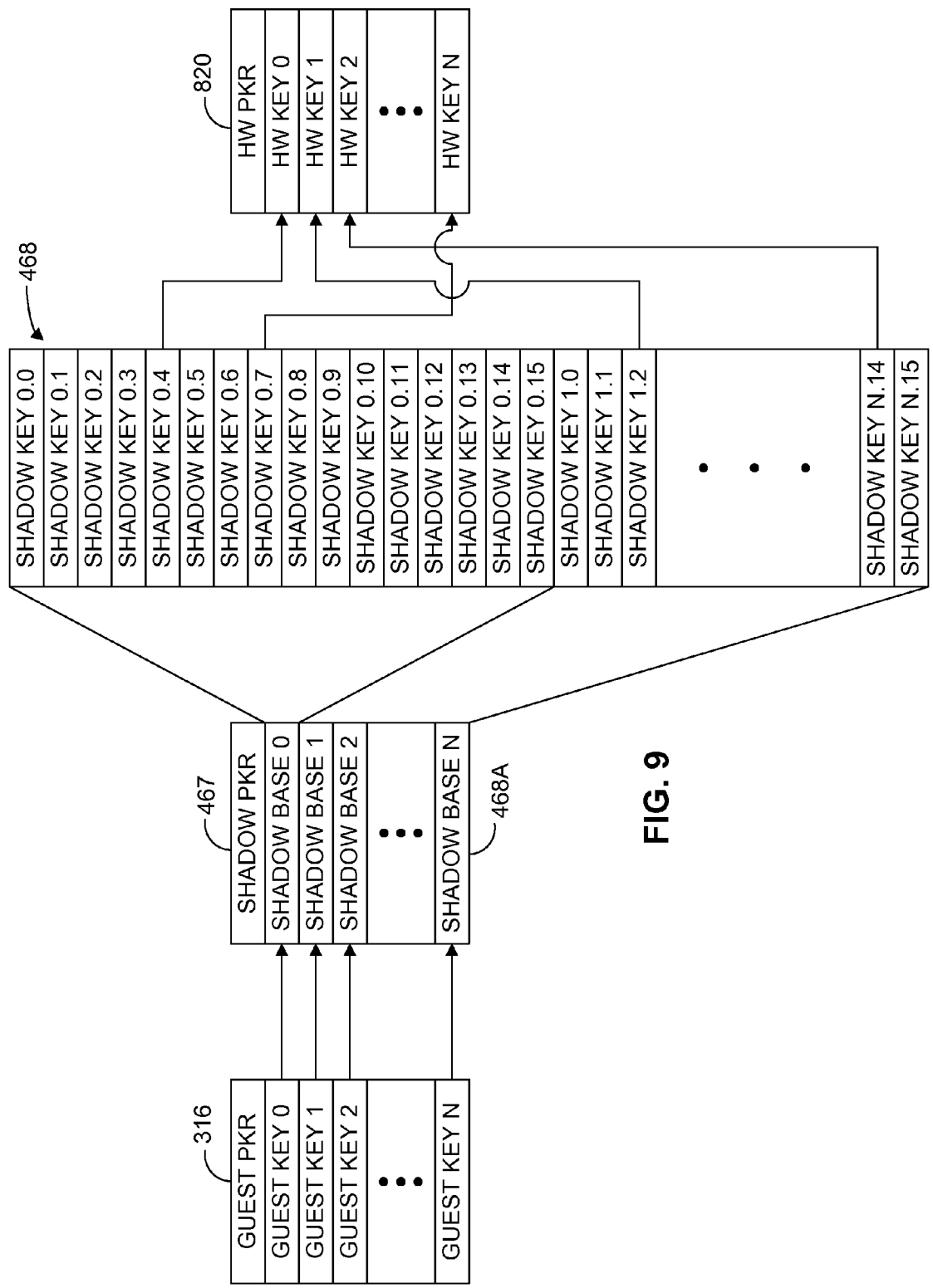
FIG. 9 illustrates several different sets of protection key register caches in a virtual computer system implementing one embodiment of this invention.

Under the invention, the VMM 400 does not simply copy keys and disable bits from the VPKR 316 into the PKR 820. Instead, the VMM takes a VTLB entry and translates it into a corresponding TLB entry, according to a method described below, and the VMM also takes a VPKR entry and translates it into a corresponding PKR entry, based on a corresponding VTLB entry and the value of the GCPL 318. The VMM also generates shadow protection keys and shadow disable bits, as illustrated in FIGS. 9, 10 and 11. The VMM creates a shadow PKR table 467 that holds a set of shadow key bases 468A, corresponding to the protection keys in the VPKR 316. The number of protection key registers in the VPKR 316, as well as the number of bits within each register, depends on the CPU that is being virtualized. Whenever the guest inserts a new key into the VPKR 316, the VMM assigns a corresponding shadow key base 468A. The assignment of a shadow key base 468A to correspond with a given guest key may be arbitrary or it may be according to some algorithm. When the guest removes a key from the VPKR 316, however, the VMM, according to the preferred embodiment of the invention, does not remove the corresponding shadow key base 468A from the shadow PKR table 467. If the guest later inserts the same key back into the VPKR 316, the VMM simply finds the corresponding shadow key base 468A, which is already located in the shadow PKR table 467.

The VMM in the preferred embodiment also keeps track of which shadow key base entries 468A correspond to current entries in the VPKR 316. FIG. 9 only shows the shadow key base entries 468A that correspond to current entries in the VPKR 316, although the VMM of the preferred embodiment also maintains other shadow key bases 468A that have been removed from the VPKR 316. The shadow key bases 468A need not have the same number of bits as the guest protection keys. In the preferred embodiment, each of the shadow key base values is a multiple of sixteen, so the least significant four bits need not be stored. In the preferred embodiment, the number of entries in the guest PKR 316 is the same as the number of entries in the hardware PKR 820, and the number of bits in each entry of the guest PKR 316 is the same as the number of bits in each entry of the hardware PKR 820, which is four greater than the number of bits in each entry of the shadow PKR table 467, although other configurations are also possible.

In the preferred embodiment, the number of possible values for a guest key is about sixteen times larger than the number of possible values for a shadow key base 468A. As a result, the shadow PKR table 467 may, at some point, run out of unique values to assign to a new shadow key base 468A to correspond with a new guest key, even if the new guest key is unique relative to all previously used guest key values. If this situation arises, the preferred embodiment will reassign a previously used shadow key base value to correspond to the new guest key value. Preferably, a shadow key base value is selected for reassignment that has not been used recently or frequently.

FIG. 9 also illustrates a series of shadow keys 468. The shadow keys 468 are shown in FIG. 9 for illustration only, as the shadow keys 468 are not actually stored in memory in the preferred embodiment of the invention. Instead, shadow keys 468 are generated as needed, by combining a shadow key base 468A and a shadow key offset 468B. As mentioned above, each shadow key base 468A is a multiple of 16. The shadow key offsets 468B range in value from zero to fifteen. Thus, a full shadow key 468 is simply a shadow key offset 468B added to a shadow key base 468A, and there are sixteen possible shadow keys 468 for each shadow key base 468A, as illustrated in FIG. 9. As described in greater detail below, selected shadow keys 468 are loaded into the hardware PKR 820. So, given a new guest key in the guest PKR 316, the invention generates a new shadow key base 468A, inserts the base into the shadow PKR 467 and notes the correspondence between the new guest key and the new shadow key base 468A. Each shadow key base 468A gives rise to sixteen shadow keys 468, each having a different shadow key offset 468B, the offsets ranging from zero to fifteen.

The guest PKR 316 and the hardware PKR 820 also contain disable bits, as described above. These disable bits are not illustrated in FIG. 9, however, as this figure focuses on the translation of keys from the guest PKR 316 to the hardware PKR 820. The disable bits in the VPKR 316 are referred to as guest disable bits, while the disable bits in the hardware PKR 820 are referred to as hardware disable bits.

In the preferred embodiment, three shadow key base values are dedicated for specific purposes, and are not assigned to correspond with guest keys. A first shadow key base 468A is dedicated to the VMM 400. A shadow key for the VMM, based on the first dedicated shadow key base value, is loaded into the hardware PKR 820, and retained there continuously. The disable bits for the PKR entry for the VMM are set to enable all access types. A second shadow key base value is dedicated for use when the guest software has disabled the domain protection key mechanism of the VM 300. In this case, the VMM 400 nonetheless enables the domain protection key mechanism of the system hardware 100. The VMM assigns the second dedicated shadow key base 468A to the guest software, as if the guest software were using a single protection key. The VMM 400 then determines shadow keys 468 for loading into the PKR 820, based on the assigned shadow key base 468A, just as if the guest software were using the protection key mechanism. The guest disable bits used for the assumed guest key enable all access types.

A third shadow key base value is dedicated for use when the guest software has disabled the virtual memory system of the VM 300. In this case, the VMM 400 nonetheless enables the virtual memory system of the system hardware 100, including the domain protection key mechanism. Again, the VMM assigns the third dedicated shadow key base 468A to the guest software, as if the guest software were using a single protection key, and determines shadow keys 468 for loading into the PKR 820, based on the assigned shadow key base 468A, just as if the guest software were using the protection key mechanism. Also, the guest disable bits used for the assumed guest key enable all access types.

When a new page table entry is loaded into the VTLB 314, the new entry includes access rights, a key, a virtual page number, a physical page number and other information, as described above. In response, the VMM 400 creates a corresponding new entry in the hardware TLB 800. The access rights and the key that are loaded into the hardware TLB 800 depend on the access rights and key loaded into the VTLB 314, as described below. The other information loaded into the hardware TLB 800 depends on the other information loaded into the VTLB 314 and the technique used to virtualize the virtual memory system. Various techniques are known in the art for vitualizing virtual memory systems. One such technique is described in co-pending U.S. patent application Ser. No. 10/263,245, entitled "Virtualization System for Computers with a Region-Based Memory Architecture", which is incorporated by reference herein.

FIG. 10 shows access rights settings that are loaded into an entry in the TLB 800, according to the preferred embodiment of this invention, in response to access rights settings that are loaded into an entry in the VTLB 314. FIG. 10 shows the access rights bits of an entry in the VTLB 314 as a guest TLB.ar 314A and the privilege level bits of an entry in the VTLB 314 as a guest TLB.pl 314B. For each combination of a guest TLB.ar 314A and a guest TLB.pl 314B, FIG. 10 specifies corresponding values for the TLB.ar 804 and the TLB.pl 806, which are inserted into a corresponding entry in the hardware TLB 800. Thus, if an entry in the VTLB 314 has an access rights value of 2 and a privilege level value of 1, a corresponding entry in the TLB 800 will have an access rights value of 2 and a privilege level value of 3. FIG. 10 also specifies a shadow key offset 468B that is used for each combination of a guest TLB.ar 314A and a guest TLB.pl 314B. Thus, for the entry in the VTLB 314 described immediately above, the shadow key offset 468B would have a value of 2. As another example of using the table of FIG. 10, if the guest TLB.ar 314A has a value of 6 and the guest TLB.pl 314B has a value of 0, the corresponding TLB.ar 804 will have a value of 2, the TLB.pl 806 will have a value of 3, and the shadow key offset 468B will have a value of 3. Using FIG. 10, the access rights settings for any entry in the VTLB 314 can be translated into corresponding protection settings to be entered into a corresponding entry in the TLB 800, along with a shadow key offset 468B.

As described above, each guest key corresponds with a single shadow key base 468A. Thus, the protection key 314C contained in an entry in the VTLB 314 corresponds with a single shadow key base 468A. Also, the access rights settings 314A and 314B loaded into the VTLB entry determine a shadow key offset 468B, as shown in FIG. 10. A shadow key 468 may be obtained by adding the shadow key offset 468B to the shadow key base 468A. The resulting shadow key 468 is loaded into a new page table entry in the hardware TLB 800, to correspond to a new entry in the VTLB 314, along with the shadow access rights settings that are determined according to the table of FIG. 10, as described above. The resulting shadow key 468 will also be used, if and when needed, to create an entry in the PKR 820 that corresponds with the new entry in the TLB 800.

The shadow key offset 468B that is determined according to the table of FIG. 10 is also used to determine a set of shadow disable bits. The shadow disable bits also depend on the current guest privilege level, maintained in the GCPL 318. The shadow disable bits are determined according to a table shown in FIG. 11. Now the table in FIG. 11 actually shows a set of guest enable bits corresponding to every possible combination of shadow key offsets 468B and guest privilege levels. For example, for a shadow key offset 468B of 5 and a guest privilege level of 1, FIG. 11 shows a set of guest enable bits of "RW." In FIG. 11, 'IR', 'W' and 'X' indicate that read accesses, write accesses and execute accesses, respectively, are permitted. Thus, the guest enable bits of "RW" indicate that read accesses and write accesses are permitted, but that execute accesses are not permitted. The corresponding set of disable bits for this set of enable bits would be "DX," indicating that execute accesses are not permitted. Other sets of disable bits can be determined for any other combination of shadow key offsets 468B and guest privilege levels, according to FIG. 11.

Figure 12:
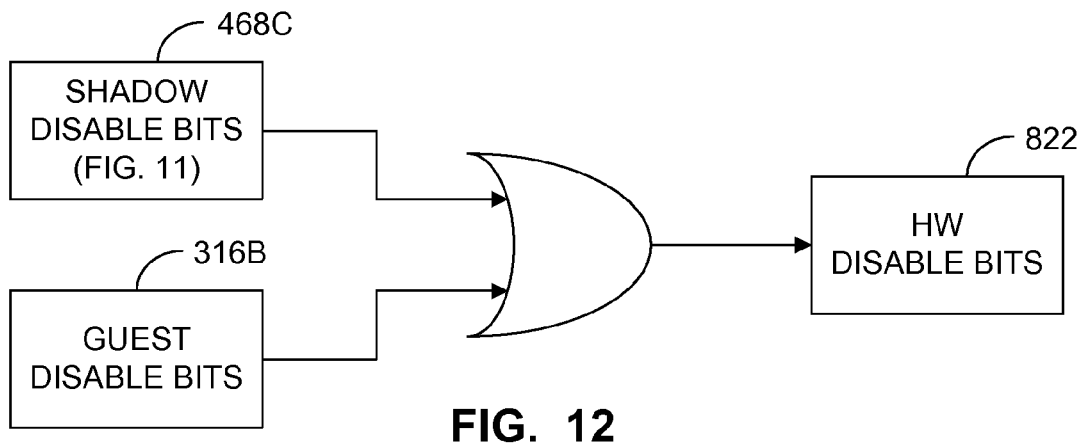
FIG. 12 illustrates how hardware disable bits are generated from shadow disable bits and guest disable bits according to one embodiment of this invention.

Now, the shadow disable bits that are determined from FIG. 11 are not necessarily stored anywhere. Instead, FIG. 12 shows a method for determining a set of hardware disable bits that are stored in the hardware PKR 820, if and when necessary. FIG. 12 shows that a logical "OR" function is performed between the shadow disable bits 468C that are determined according to the table of FIG. 11 and the guest disable bits 316B that are stored in a corresponding entry within the VPKR 316. The result of the logical "OR" function is a set of hardware disable bits 822 that may be used in a corresponding entry within the PKR 820. Thus, a hardware disable bit for a specific access type will be set if either the corresponding shadow disable bit or the corresponding guest disable bit is set, or both.

Suppose that the guest software has inserted a first entry into the VTLB 314, including a first VTLB.ar value 314A, a first VTLB.pl value 314B and a first protection key value in the first VTLB.key 314C. Suppose further that the guest software has inserted a first entry into the VPKR 316, including a first set of guest disable bits 316B and the same first protection key value in the first VPKR.key 316A as was inserted in the first VTLB.key 314C, such that the first entry in the VPKR 316 corresponds with the first entry in the VTLB 314. The text above describes methods according to the preferred embodiment of the invention for translating the first entry in the VTLB 314 and the first entry in the VPKR 316 into a corresponding first entry in the TLB 800 and a corresponding first entry in the PKR 820, based on the current value of the GCPL 318. These methods are illustrated again, in a summary format, in FIG. 13.

The first TLB.ar value 804 and the first TLB.pl value 806 are determined according to the table of FIG. 10 from the first VTLB.ar value 314A and the first VTLB.pl value 314B. A corresponding shadow key offset 468B is also determined according to the table of FIG. 10 from the first VTLB.ar value 314A and the first VTLB.pl value 314B. A corresponding shadow key base 468A is determined in an arbitrary manner from the first protection key value from either the first VTLB.key 314C or the first VPKR.key 316A. A corresponding shadow key 468 is formed by adding the shadow key offset 468B to the shadow key base 468A. The shadow key 468 is inserted into the TLB.key 802 of the first entry in the TLB 800 and, if and when needed, into the PKR.key 824 of a first entry of the PKR 820. A set of shadow disable bits 468C are determined from the shadow key offset 468B and the GCPL 318 according to the table of FIG. 11, as described above. A set of hardware disable bits are determined from the guest disable bits 316B and the shadow disable bits 468C by performing a logical "OR" operation. The hardware disable bits are inserted into the disable bits 822 of the first entry of the PKR 820, if and when needed.

Figure 13:
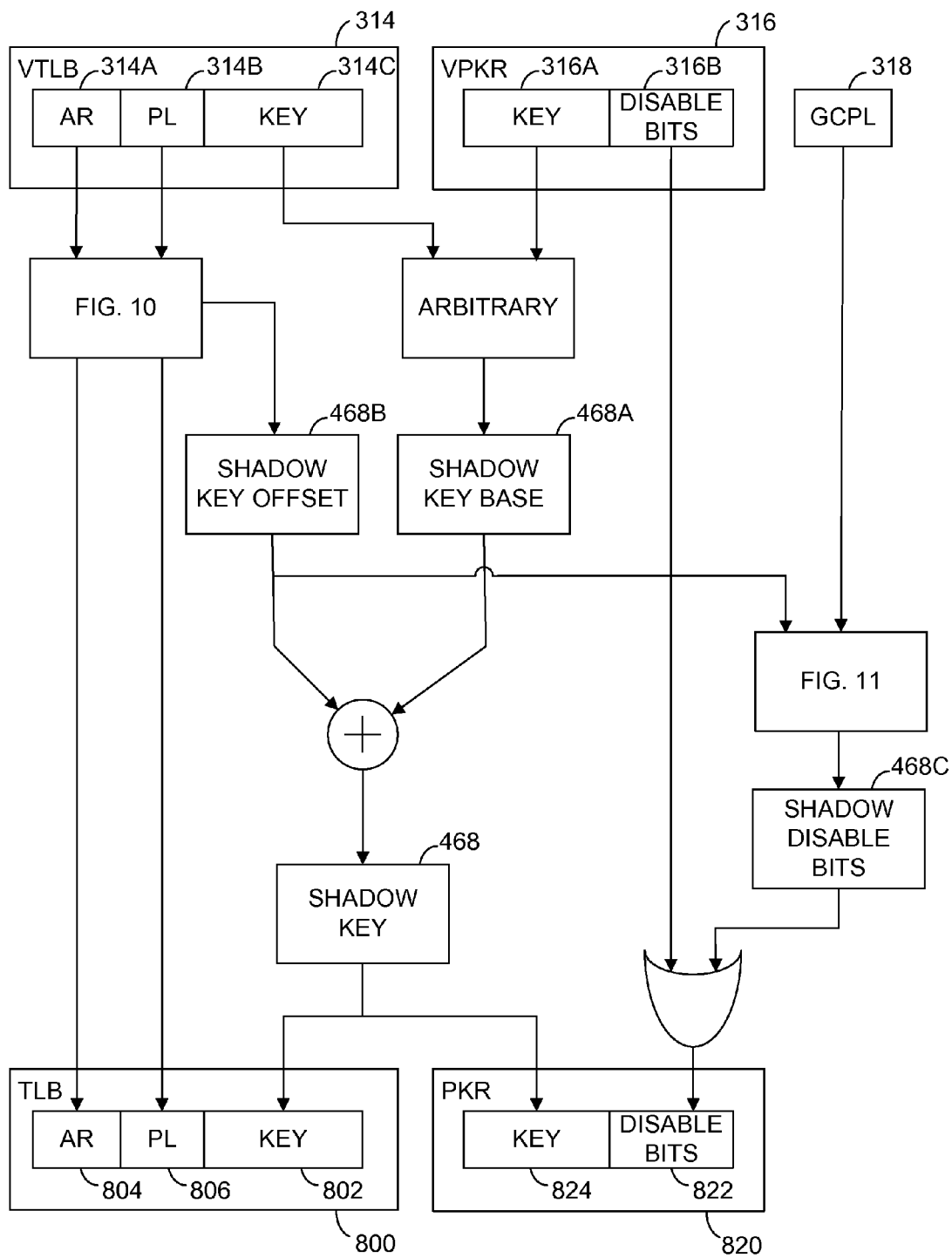
FIG. 13 illustrates a method according to one embodiment of this invention for translating virtual protection settings for both of the protection mechanisms of the IA-64 architecture into corresponding hardware protection settings, based on the current guest privilege level.

The methods of the invention, as illustrated in FIG. 13, accurately virtualize both the domain protection key mechanism and the access rights protection mechanism of the IA-64 architecture. Also, according to the methods of the invention, the only aspects of the VM 300 that affect the values entered into the TLB 800 are the values in a corresponding entry in the VTLB 314. In particular, the value in the GCPL 318 does not affect the values entered into the TLB 800. As a result, the TLB 800 does not need to be flushed each time the guest privilege level changes. Instead, the value in the GCPL 318 only affects the disable bits 822 that are entered into a corresponding entry in the PKR 820. The disable bits 822 are also affected by the values in the corresponding entry in the VTLB 314, through an intermediate step of determining a shadow key offset 468B. In addition, the disable bits 822 are affected by the guest disable bits 316B in a corresponding entry in the VPKR 316. The access rights bits 314A and 314B of the VTLB entry also affect the key 802 in the TLB entry and the key 824 in the PKR entry. The key 802 in the TLB entry and the key 824 in the PKR entry are also affected by the key 314C in the VTLB entry, which is the same as the key 316A in the VPKR entry.

Figure 14:
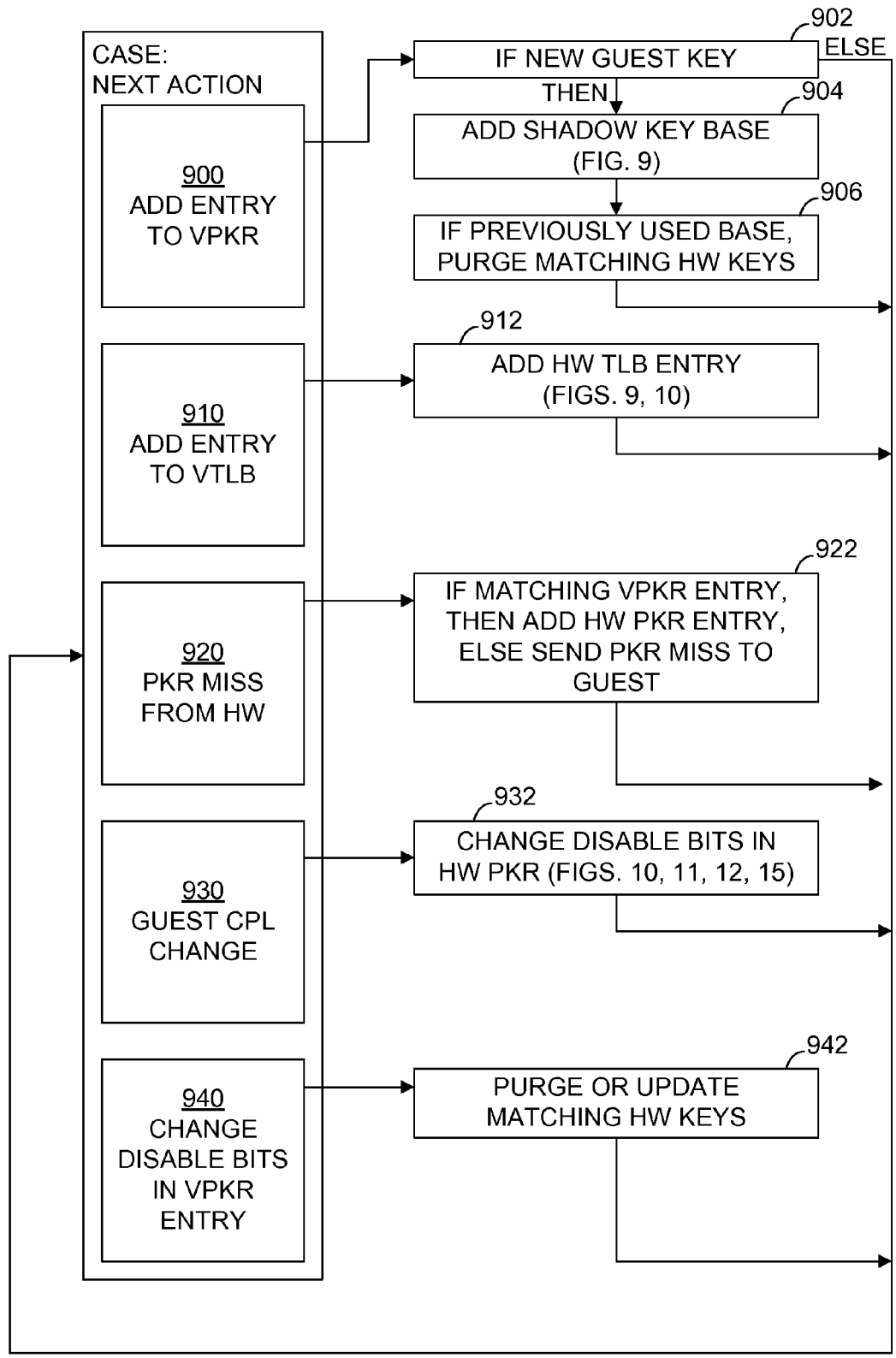
FIG. 14 illustrates several events related to protection mechanisms that may occur in a virtual computer system, along with responsive actions taken by one embodiment of this invention.

The protection unit 466 of the VMM 400 performs the methods described above, in response to various actions by the guest software and in response to various system events, to virtualize the protection mechanisms of the IA-64 architecture. Some of the actions of the guest software and some of the system events are illustrated in FIG. 14, along with brief illustrations of the corresponding responses from the protection unit 466.

First, the guest software may insert an entry into the VPKR 316, including a key 316A and a set of guest disable bits 316B, as illustrated at a block 900. In response, as shown at a step 902, if the shadow PKR table 467 already contains a shadow key base 468A that corresponds with the inserted key 316A (i.e. the added guest key is not new), then the protection unit 466 simply indicates in the shadow PKR table 467 that the shadow key base 468A corresponds to the inserted key 316A, which is now loaded into the VPKR 316, and terminates its response to the entry in the VPKR 316. On the other hand, if the inserted key 316A is a new guest key because it does not already have a corresponding shadow key base 468A in the shadow PKR table 467, then, at a step 904, the protection unit 466 assigns a new shadow key base 468A in an arbitrary manner to correspond with the inserted key 316A and the protection unit 466 inserts the new shadow key base 468A into the shadow PKR table 467, as illustrated in FIG. 9 and as described above.

The protection unit 466 will assign a shadow key base 468A that has not been previously used, if possible. However, if all possible shadow key base values have been previously used, the protection unit 466 will reassign a previously used shadow key base value. In this event, there may be one or more keys 824 in the hardware PKR 820 that were based on the previous use of the reused shadow key base value. Any such keys 824 are no longer valid, once the shadow key base value is reassigned. Accordingly, the protection unit 466 searches the hardware PKR 820 for keys 824 that match the newly assigned shadow key base 468A, meaning that the matching key 824 may be formed by adding an offset value from zero to fifteen to the shadow key base 468A. If there are any matching keys 824 in the hardware PKR 820, the matching entries are purged from the PKR 820, as illustrated at a step 906. In addition, any matching entries in a set of PKR stores 820A, 820B, 820C and 820D are also purged. The PKR stores 820A, 820B, 820C and 820D are described below in connection with FIG. 15. Finally, if the protection unit 466 reassigns a previously used shadow key base value, the protection unit 466 also flushes the hardware TLB 800 and purges any matching entries in the hardware virtual hash page table (VHPT). This ends the response of the protection unit 466 to the insertion of a new entry into the VPKR 316.

Note that, in the preferred embodiment, the protection unit 466 does not insert an entry into the hardware PKR 820 at this point. This is because the corresponding entry or entries that will need to be inserted into the PKR 820 will also depend on corresponding entries that are inserted into the VTLB 314. There could be multiple entries within the VTLB 314 that have a key 314C that matches the key 316A. Each matching entry in the VTLB 314 will typically have different values in the VTLB.ar 314A and the VTLB.pl 314B. The different values in the VTLB.ar 314A and the VTLB.pl 314B will yield different shadow key offsets 468B, which will give rise to multiple PKR entries. Therefore, each entry in the VPKR 316 may correspond to multiple entries in the PKR 820, depending on the corresponding entries in the VTLB 314. In the preferred embodiment of the invention, the number of entries in the VPKR 316 is the same as the number of entries in the PKR 820. As a result, the PKR 820 may not be able to hold all of the entries that could correspond to the entries in the VPKR 316. As a result, even if the VPKR 316 has an entry that corresponds with each entry in the VTLB 314, the PKR 820 may not be able to hold an entry for each of the entries in the TLB 800.

The second action or event illustrated in FIG. 14 involves the guest software inserting a new entry into the VTLB 314, including a VTLB.ar value 314A, a VTLB.pl value 314B and a key 314C, as illustrated at a block 910. In response, as shown at a step 912, the protection unit 466 inserts a corresponding new entry into the TLB 800, having translated values for the TLB.ar 804, the TLB.pl 806 and the TLB.key 802, as described above relative to FIGS. 9 and 10. Typically, there will already be an entry in the VPKR 316 that matches the new entry in the VTLB 314. If a matching VPKR entry exists, then a shadow key base value would have already been assigned for the key 314C in the new VTLB entry. The TLB.key 802 is determined from this shadow key base value. At this point, a corresponding entry could also be added to the PKR 820, using the same shadow key 468 and the guest disable bits 316B of the corresponding VPKR entry. If there is no matching VPKR entry, then the protection unit 466 will have to assign a shadow key base 468A, as described above in connection with FIG. 9, which would then be used to determine the TLB.key 802.

For the third action or event, suppose a memory access is attempted in guest memory, and an entry in the TLB 800 has a matching virtual address, so that a key 802 is obtained for the attempted access. Suppose further, however, that the PKR 820 has no entry with a matching key 824. The system hardware 100 will issue a PKR Miss fault, as illustrated at the block 920. As described above, however, the PKR 820 may not be able to hold corresponding values for each of the entries in the TLB 800, even if the VPKR 316 contains corresponding values for each of the entries in the VTLB 314. Thus, despite the PKR Miss fault, the VPKR 316 may contain an entry that matches the corresponding VTLB entry. In other words, a PKR Miss fault could occur in the system hardware 100 even though it would not have occurred if the guest software had been executed on real hardware. Thus, to accurately virtualize the IA-64 architecture, the protection unit 466 first determines whether the PKR Miss fault would have occurred if the guest software had been executed on real hardware.

As described above, the protection unit 466 keeps track of the shadow key base values 468A that correspond to guest keys that are currently loaded into the VPKR 316. When a PKR Miss fault occurs, the protection unit 466 looks in the shadow PKR table 467 for the shadow key base 468A that matches the key 802 in the TLB entry that gave rise to the PKR Miss fault. If the shadow key base 468A corresponds with a guest key that is not loaded into the VPKR 316, then a PKR Miss fault would have issued if the guest software had been executed on real hardware, and the PKR Miss fault is forwarded to the guest software. Otherwise, the PKR Miss fault is not appropriate within the VM 300. So, instead of forwarding the PKR Miss fault to the guest software, the protection unit 466 handles the PKR Miss fault itself by adding a new entry in the PKR 820, as shown at a step 922. The new entry in the PKR 820 will have a key 824 that matches the key 802 from the TLB entry that gave rise to the PKR Miss fault. The hardware disable bits 822 for the new PKR entry will be determined as described above, based on the GCPL 318, the guest disable bits 316B in the corresponding VPKR entry and the corresponding shadow key offset 468B. The shadow key offset 468B may be obtained from the lowest four bits of the key 802. After inserting the new entry in the hardware PKR 820, execution of guest instructions resumes at the same instruction that gave rise to the PKR Miss fault.

If the PKR Miss fault is forwarded to the guest software for processing, the guest software will typically respond by adding a new entry into the VPKR 316. When execution of guest instructions resumes at the instruction that gave rise to the PKR Miss fault, another PKR Miss fault will occur. But this time, the protection unit 466 will be able to add a corresponding entry to the PKR 820 to resolve the PKR Miss fault and allow the faulting guest instruction to execute. In another embodiment of the invention, the protection unit 466 anticipates the second PKR Miss fault and adds the new entry into the PKR 820 in response to the new entry in the VPKR 316, thereby avoiding the second PKR Miss fault.

A fourth event that may occur is a change in the guest privilege level, maintained in the GCPL 318, as illustrated at a block 930. As described above, the value in the GCPL 318 affects the disable bits 822 in the PKR 820, but the value in the GCPL 318 does not affect any of the values in the TLB 800. As a result, unlike other possible solutions to the ring compression problem, the TLB 800 does not need to be flushed upon a change in the GCPL 318. Instead, the entries in the PKR 820 must be changed or removed to effect updates to the hardware disable bits 822, based on the new value in the GCPL 318, as illustrated in a step 932. Generally, the entries in the PKR 820 can be changed more efficiently than the entries in the TLB 800. The new disable bits 822 are determined according to FIG. 11, as described above.

Figure 15:
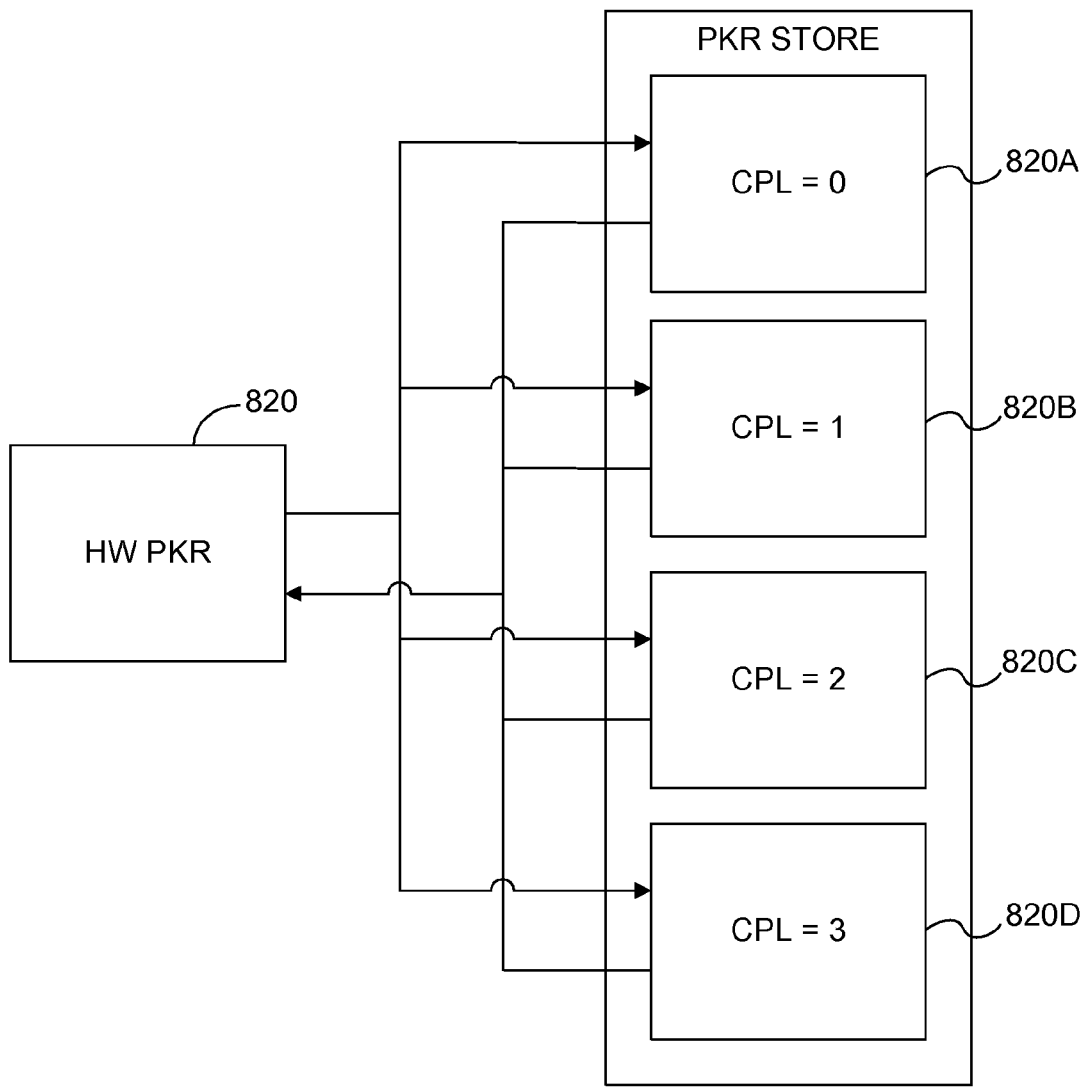
FIG. 15 illustrates a protection key register store for saving a separate image of the hardware protection key register cache for each privilege level of the VM.

Now there are several different options here for updating the disable bits 822 in the PKR 820. The protection unit 466 may re-evaluate each entry in the PKR 820 and change each entry's hardware disable bits 822, based on the new GCPL 318. Alternatively, the protection unit 466 may flush the PKR 820 and add new PKR entries with updated disable bits 822 in response to the resulting PKR Miss faults. A third option is illustrated in FIG. 15. Under this option, the protection unit 466 maintains four separate copies, or "PKR stores," of the contents of the hardware PKR 820 in memory. Each copy of the PKR 820 corresponds to a different one of the possible values of the GCPL 318. Thus, a first copy 820A corresponds to a GCPL value of 0, a second copy 820B corresponds to a GCPL value of 1, a third copy 820C corresponds to a GCPL value of 2 and a fourth copy 820D corresponds to a GCPL value of 3. Thus, when the value in the GCPL 318 changes, the protection unit 466 copies the existing contents of the PKR 820 into memory in the PKR store that corresponds to the old value of the GCPL 318, and the protection unit 466 copies the contents of the PKR store that corresponds to the new value of the GCPL 318 into the PKR 820.

The third option is more efficient than the first two options in some embodiments because it results in fewer PKR Miss faults. The GCPL 318 frequently changes because the guest software has switched from one context to another, such as from a guest application running at a privilege level of 3 to a guest OS routine running at a privilege level of 0. Each routine generally uses different entries within the VTLB 314, and maybe also different entries within the VPKR 316, which correspond to different entries within the PKR 820. When the GCPL 318 changes to a new value, the guest memory accesses are generally more likely to correspond with the entries that were in the PKR 820 the last time the GCPL 318 had the new value than with the current entries in the PKR 820.

A fourth option for updating the disable bits 822 in the PKR 820 again uses the PKR stores illustrated in FIG. 15. However, instead of copying the contents of the PKR 820 into the corresponding PKR store upon a change in the value of the GCPL 318, the corresponding PKR store is modified each time the PKR 820 is modified, so that the corresponding PKR store is always up-to-date relative to the PKR 820. Under this option, the only thing that must be done when the value of the GCPL 318 changes is to copy the contents of the PKR store corresponding to the new value of the GCPL 318 into the PKR 820.

This fourth option is typically more efficient than the third option, because it avoids having to read the PKR 820 to update the corresponding PKR store. Instead of writing a value to the PKR 820, and then later reading the same value from the PKR 820 and writing it to the corresponding PKR store, the fourth option simply writes the same value to both the PKR 820 and the corresponding PKR store at the same time. However, if the PKR 820 is modified frequently relative to the frequency of changes in the GCPL 318, then the third option may be more efficient because it can avoid multiple writes to the same location in the corresponding PKR store. Under the fourth option, if the same entry in the PKR 820 is modified multiple times while the value of the GCPL 318 remains unchanged, all but the last write to the corresponding PKR store will be wasted. However, the fourth option is typically more efficient because the value of the GCPL 318 typically changes much more frequently than do entries in the PKR 820.

Both options three and four may be particularly efficient in microprocessors implementing advanced technologies such as Explicitly Parallel Instruction Computing (EPIC), because all of the operations for writing values into the individual PKR entries may be performed as a group, at substantially the same time. For example, in the IA-64 architecture, multiple PKR writes may be performed consecutively, without any intervening serializations, causing the latencies associated with the multiple PKR writes to overlap one another, substantially reducing the overall time required to write and serialize the PKR data.

A fifth event that could occur involves the guest software changing the guest disable bits 316B in an entry in the VPKR 316, as illustrated at a block 940. A change in the guest disable bits 316B only affects the hardware disable bits 822 in any corresponding entries in the PKR 820. Thus, the protection unit 466 searches the PKR 820 and the PKR stores 820A, 820B, 820C and 820D, for entries that include a key 824 that matches the shadow key base 468A that corresponds with the key 316A of the modified VPKR entry. If any such matching entries are found, the entries may be purged, so that the disable bits 822 will be updated in response to a subsequent PKR Miss fault, or the disable bits 822 may be updated immediately, using the methods described above. The step of purging or updating the matching entries in the PKR 820 is illustrated at a step 942.

As described above, when guest instructions are being directly executed on the system hardware 100, the CPL 842 is maintained at a value of 3, while, when the guest instructions are being interpreted, or translated instructions are being executed, the CPL 842 is maintained at a value of 0. The methods described above for virtualizing the protection mechanisms of the IA-64 architecture, including the translations specified in the tables of FIGS. 10 and 11, work correctly for either of these hardware privilege levels. In fact, setting the TLB.pl 806 to a value of 3 for all possible access rights settings in the VTLB 314, as shown in FIG. 10, eliminates the dependence of the protection mechanisms on the value in the CPL 842, at least for all TLB entries for which the translations are performed. Thus, the methods and translations described above would also work for hardware privilege levels of 1 or 2.

The translations specified in FIGS. 10 and 11 and the methods described above are part of the preferred embodiment of the invention. Various other embodiments of the invention, using other translations and methods are also possible, however. For example, all of the TLB.ar values 804 and all of the TLB.pl values 806 could be set to a value of 3, regardless of the corresponding values in VTLB.ar 314A and VTLB.pl 314B, so that the access rights protection mechanism would allow any type of access in the system hardware 100. Each of the possible combinations of VTLB.ar 314A and VTLB.pl 314B could be assigned a unique shadow key offset 468B, ranging from 0 to 31, for example in increasing numerical order. The shadow key base values 468A could then be multiples of 32. Then, the shadow disable bits 468C could be established for the various combinations of shadow key offsets 468B and guest privilege levels so that the protection key mechanism restricts access in the same way that both protection mechanisms would have restricted access if the guest software were executing on a physical computer system.

For example, for a VTLB.ar value of 5 and a VTLB.pl value of 2, the shadow key offset 468B would be 21 and the guest disable bits would be "DR DW DX" (meaning disable read, write and execute accesses, respectively) for a GCPL of 3, "DW" for a GCPL of 2 or 1, and there would be no disable bits set for a GCPL of 0. Guest disable bits could be established for all other combinations of VTLB.ar 314A and VTLB.pl 314B in the same way. Now, although this alternative embodiment would work correctly, it would not be as efficient as the preferred embodiment for various reasons. For example, because each key 316A in the VPKR 316 leads to 32 possible shadow keys 468, instead of the 16 possible shadow keys 468 in the preferred embodiment, there is likely to be more PKR Miss faults because the correct shadow keys 468 are not as likely to be resident in the hardware PKR 820 at any given time.

Many other possible variations on the translations are also possible. Some of the important design criteria are that the access rights protection mechanism implemented in the system hardware 100 must not be any more restrictive than the access rights mechanism in the VM 300 would be, given the possible values of the CPL 842. In other words, the hardware access rights mechanism must not prohibit any accesses that would be permitted in the VM 300. As long as the hardware access rights translations are established in this manner, the protection key mechanism can be used to prohibit any accesses that would not be permitted in the VM 300, but that are permitted under the hardware access rights mechanism. The preferred embodiment and the alternative embodiment described above represent the two extremes in the hardware access rights mechanism, with the access rights mechanism in the preferred embodiment being as restrictive as possible, without being overly restrictive, and with the access rights mechanism in the alternative embodiment not being restrictive at all, at least with respect to TLB entries for which the translation is performed.

Within the guidelines described above, embodiments that use fewer shadow keys 468 are generally better, as they will generally have fewer PKR Miss faults. So, combining multiple combinations of guest access rights settings under a single shadow key offset 468B is generally better. The preferred embodiment is particularly good because it reduces the number of shadow key offsets 468B from a possible 32 down to just 16, which requires only 4 bits to specify, and which also leaves an extra bit for the shadow key base values 468A.

Also, the concept of combining a shadow key base 468A and a shadow key offset 468B is not necessary to the invention either. Using the hardware key protection mechanism to restrict accesses that would be prohibited by the access rights mechanism in the VM 300, as in the preferred embodiment, means that multiple keys will generally be used in the PKR 820 for a single key in the VPKR 316. In the preferred embodiment, these multiple keys are generated using the shadow key base and offset construct. However, these extra keys could be generated in various other ways too, including possibly an arbitrary assignment of entire shadow keys 468. In this case, shadow disable bits 468C corresponding to a specific shadow key 468 could be generated directly from the virtual access rights settings 314A and 314B, without the intermediate step of determining a shadow key offset 468B.

Finally, the invention is not limited to the specific protection mechanisms of the IA-64 architecture. The invention may also be implemented in other architectures that provide different protection mechanisms. If the hardware architecture provides multiple protection mechanisms, including at least one mechanism that is dependent on the privilege level at which the hardware is executing (a "primary protection mechanism") and at least one mechanism that does not depend on the privilege level (a "secondary protection mechanism"), the concepts of the invention may be applied to combine the protection mechanisms to address the ring compression problem described above. The primary protection mechanism in the hardware may be set up so that it does not overly restrict accesses, and then the secondary mechanism may be set up so that it restricts any accesses that would be prohibited in the virtual machine, but that are not prohibited under the primary protection mechanism.

The invention may also apply to implementations in which the virtualized platform does not match the physical hardware platform. For example, suppose that a physical hardware system includes a primary protection mechanism that is dependent on the privilege level at which software is executing and a secondary protection mechanism that is independent of the privilege level. Suppose further that a virtual machine is to be created having a different hardware platform, the virtual platform including only one protection mechanism that is dependent on the privilege level. The concepts of the invention may be applied to use the primary and secondary protection mechanisms of the physical platform to virtualize the one protection mechanism of the virtual platform.

As a second example, a physical platform may include a primary protection mechanism that is dependent on the privilege level and a secondary protection mechanism that is independent of the privilege level. The virtualized platform may include the same primary protection mechanism, but a different secondary protection mechanism. In this case, the concepts of the invention may be applied to virtualize both protection mechanisms of the virtual platform, using the protection mechanisms of the physical platform. The concepts of the invention may also be extended to various other implementations, including physical platforms having one, two or more protection mechanisms and/or virtual platforms having one, two or more protection mechanisms.

What is claimed is:

1. A computer program embodied in a non-transitory, computer-readable medium for virtualizing an access rights protection mechanism and a protection key mechanism in a virtual machine running on a physical hardware system that implements a physical access rights protection mechanism and a physical protection key mechanism, the physical hardware system having a hardware privilege level, the computer program performing a method comprising:

providing a guest privilege level for the virtual machine and allowing guest software to operate at any privilege level of the virtual machine while restricting the hardware privilege level at which guest instructions are executed to less than all the possible hardware privilege levels;

providing virtual access rights settings and virtual protection key settings to be set by the guest software running on the virtual machine to control the operation of the virtual access rights protection mechanism and the virtual protection key mechanism, respectively;

translating the virtual access rights settings into physical access rights settings to control the operation of the physical access rights protection mechanism to permit all memory accesses that should be permitted according to the virtual access rights protection mechanism and to permit one or more memory accesses that should be prevented according to the virtual access rights protection mechanism, the translation of access rights settings being independent of the guest privilege level; and translating both the virtual access rights settings and the virtual protection key settings into physical protection key settings to control the operation of the physical protection key mechanism to prevent all attempted memory accesses that should be prevented according to the virtual access rights protection mechanism, but that are permitted by the physical access rights protection mechanism, as well as preventing all attempted memory accesses that should be prevented according to the virtual protection key mechanism, the translation of protection key settings being dependent on the guest privilege level.

2. The computer program of claim 1, in which the virtual access rights settings are used to determine shadow key offset values that are used in the translation of protection key settings.

3. The computer program of claim 2, in which a shadow key for use in the physical protection key settings is determined by adding a shadow key offset to a shadow key base.

4. The computer program of claim 3, in which the shadow key base is determined in an arbitrary manner.

5. The computer program of claim 3, in which a shadow key offset value corresponds with multiple different virtual access rights settings.

6. The computer program of claim 1, in which a plurality of copies of physical protection key settings are stored, with one copy for each guest privilege level, each copy corresponding to the physical protection key settings used the last time the virtual machine was executing at the respective guest privilege level.

7. The computer program of claim 6, in which the copy of physical protection key settings corresponding to the current guest privilege level is updated each time the current protection key settings are updated.

8. The computer program of claim 1, in which the virtual machine is based on the Intel IA-64 architecture and the physical hardware system is based on the IA-64 architecture.

9. A computer program embodied in a non-transitory, computer-readable medium, the computer program performing a method comprising:

virtualizing a first protection mechanism that is dependent on a guest privilege level at which a virtual machine is executing using a second hardware protection mechanism that is dependent on a hardware privilege level and a third hardware protection mechanism that is independent of the hardware privilege level, wherein the virtual machine is allowed to operate at any guest privilege level while the hardware privilege level is restricted to less than all of the available privilege levels, the method further comprising:

providing a first set of protection settings in the virtual machine for controlling the first protection mechanism;

selecting a second set of protection settings for the second protection mechanism, the second set of protection settings being dependent on the first set of protection settings but independent of the guest privilege level, the second set of protection settings being selected to permit all memory accesses that should be permitted according to the first protection mechanism and to permit one or more memory accesses that should be prevented according to the first protection mechanism; and selecting a third set of protection settings for the third protection mechanism, the third set of protection settings being dependent on the first set of protection settings and the guest privilege level, the third set of protection settings being selected to prevent all memory accesses that should be prevented according to the first protection mechanism, but which are permitted under the second protection mechanism.

10. The computer program of claim 9, in which a fourth protection mechanism is also virtualized, the fourth protection mechanism being independent of the guest privilege level, and in which the third set of protection settings is selected to also prevent memory accesses that should be prevented according to the fourth protection mechanism.

11. The computer program of claim 10, in which the first and second protection mechanisms are access rights protection mechanisms and the third and fourth protection mechanisms are domain protection key mechanisms.

12. The computer program of claim 11, in which the virtual machine is based on the Intel IA-64 architecture and the virtual machine executes on a physical hardware system that is also based on the Intel IA-64 architecture.

13. The computer program of claim 9, in which the second set of protection settings is selected by translating the first set of protection settings according to a predetermined method.

14. The computer program of claim 9, in which the third set of protection settings is selected by translating the first set of protection settings according to a predetermined method, using the guest privilege level.

15. The computer program of claim 10, in which a fourth set of protection settings is provided in the virtual machine for controlling the fourth protection mechanism, and the third set of protection settings is selected by translating the first and fourth sets of protection settings according to a predetermined method, using the guest privilege level.

16. The computer program of claim 9, in which the first and second protection mechanisms are access rights protection mechanisms and the third protection mechanism is a protection key mechanism, and in which the first set of protection settings is used to determine a set of shadow key offset values that are used to select the third set of protection settings.

17. The computer program of claim 9, in which a plurality of copies of the third set of protection settings are stored, one copy for each guest privilege level, the stored copies corresponding to the third set of protection settings used the last time the virtual machine was operating at the respective guest privilege level.

18. The computer program of claim 17, in which the copy corresponding to the current guest privilege level is updated each time the third set of protection settings is updated.

19. A method for virtualizing an access rights protection mechanism and a protection key mechanism in a virtual computer system executing on a physical hardware system, the physical hardware system having a hardware privilege level, a physical access rights protection mechanism controlled by physical access rights settings and a physical protection key mechanism controlled by physical protection key settings, the method comprising:

wherein the virtual computer system has a virtual machine running guest software, the virtual machine having a guest privilege level, a virtual access rights protection mechanism controlled by virtual access rights settings and a virtual protection key mechanism controlled by virtual protection key settings, the guest software operating at any privilege level of the virtual machine while the hardware privilege level at which guest software is executed is restricted to less than all the possible hardware privilege levels;

translating the virtual access rights settings into physical access rights settings to control the physical access rights mechanism to permit all attempted memory accesses that should be permitted according to the virtual access rights protection mechanism and to permit one or more memory accesses that should be prevented according to the virtual access rights protection mechanism, the translation of access rights settings being independent of the guest privilege level; and translating both the virtual access rights settings and the virtual protection key settings into physical protection key settings to control the physical protection key mechanism to prevent all attempted memory accesses that should be prevented according to the virtual access rights protection mechanism, but that are permitted by the physical access rights protection mechanism, as well as preventing all attempted memory accesses that should be prevented according to the virtual protection key mechanism, the translation of protection key settings being dependent on the guest privilege level.

20. The method of claim 19, wherein the step of translating the virtual access rights settings and the virtual protection key settings into physical protection key settings includes determining shadow keys comprising shadow key base values and shadow key offset values.

* * * * *